US012136242B2

(12) United States Patent
Flynn et al.

(10) Patent No.: US 12,136,242 B2
(45) Date of Patent: Nov. 5, 2024

(54) ENCODING AND DECODING MAP DATA

(71) Applicant: Apple Inc., Cupertino, CA (US)

(72) Inventors: David Flynn, Darmstadt (DE); Khaled Mammou, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 17/833,468

(22) Filed: Jun. 6, 2022

(65) Prior Publication Data
US 2022/0398782 A1    Dec. 15, 2022

Related U.S. Application Data

(60) Provisional application No. 63/197,245, filed on Jun. 4, 2021.

(51) Int. Cl.
*G06T 9/00* (2006.01)
*G06T 17/00* (2006.01)
*G06T 17/05* (2011.01)

(52) U.S. Cl.
CPC ............ *G06T 9/00* (2013.01); *G06T 17/00* (2013.01); *G06T 17/05* (2013.01)

(58) Field of Classification Search
CPC ......... G06T 17/05; G06T 17/00; G06T 17/20; G06T 2210/04; G06T 7/13; G06T 9/00; G06T 9/001; G06T 2207/30184; G06T 7/62; G06T 7/12; G06T 7/181; G06F 16/29; G06F 30/13; G06F 30/00
See application file for complete search history.

(56) References Cited

U.S. PATENT DOCUMENTS

| 10,805,646 B2 | 10/2020 | Tourapis et al. |
| 10,909,727 B2 | 2/2021 | Mammou et al. |
| 2003/0184545 A1* | 10/2003 | Ohto ............... G06V 20/13 345/419 |
| 2015/0130797 A1* | 5/2015 | Chen ................ G06T 17/10 345/420 |
| 2016/0054132 A1* | 2/2016 | Strassenburg-Kleciak ............. G06T 11/20 701/409 |

* cited by examiner

*Primary Examiner* — Xiao M Wu
*Assistant Examiner* — Scott E Sonners
(74) *Attorney, Agent, or Firm* — Fish & Richardson P.C.

(57) ABSTRACT

An exemplary system receives first data representing one or more buildings, and generates second data representing the one or more buildings. Generating the second data includes, for each of the one or more buildings: (i) determining, based on the first data, a plurality of first edges defining an exterior surface of at least a portion of the building, where the first edges interconnect at a plurality of first points, (ii) encoding, in the second data, information corresponding to the quantity of the first points, (iii) encoding, in the second data, an absolute position of one of the first points, and (iv) for each of the remaining first points, encoding, in the second data, a position of that first point relative to a position of at least another one of the first points. The system outputs the second data.

25 Claims, 17 Drawing Sheets

Last vertex in ring prediction (intersection predictor)

Predicted ring (intra-ring vector prediction)

Identifier list

| | src index | identifier value | out index | identifier value | |
|---|---|---|---|---|---|
| A | 0 | 33879490597 | 1 | 27100447421 | B |
| B | 1 | 27100447421 | 0 | 33879490597 | A |
| C | 2 | 34301026058 | 3 | 33879490599 | D |
| D | 3 | 33879490599 | 2 | 34301026058 | C |

FIG. 8C

To code A, the prediction residual A − B' is formed. The predictor B is replaced by B' since A XOR B shows that the allocation serial has changed.

```
  1 1 1 1 1 1 0 0 1 1 0 1 1 0 0 0 0 0 0 0 0 0 0 0 0 0 1 0 0 1 0 1       A
− 1 1 0 0 1 0 0 1 1 1 1 0 1 0 1 0 0 0 0 0 0 0 0 0 0 0 0 0 0 0 0 0       $B_{modified}$
  1 1 0 0 1 0 1 0 0 0 0 0 1 0 0 0 0 0 0 0 0 0 0 0 0 0 0 1 0 0 1 0 1     A − $B_{modified}$
                          X
```

To code D, the prediction residual D − A is formed. The predictor A is used directly since D XOR A shows that the allocation serial has not changed.

```
  1 1 1 1 1 1 0 0 1 1 0 1 1 0 0 0 0 0 0 0 0 0 0 0 0 0 1 0 0 1 1 1       D
− 1 1 1 1 1 1 0 0 1 1 0 1 1 0 0 0 0 0 0 0 0 0 0 0 0 0 1 0 0 1 0 1       A
                                                              1 0       D − A
```

To code C, the prediction residual C − D' is formed. The predictor D is replaced by D' since D XOR C shows that the allocation serial has changed.

```
  1 1 1 1 1 1 1 1 0 0 1 0 0 0 0 0 0 0 0 0 1 1 1 1 1 0 0 0 1 0 1 0       C
− 1 1 1 1 1 1 0 0 0 1 1 0 1 1 0 0 0 0 0 0 0 0 0 0 0 0 0 0 0 0 0 0       $D_{modified}$
  1 1 0 0 1 0 0 1 0 0 0 0 0 0 0 0 1 1 1 1 1 0 0 0 1 0 1 0                C − $D_{modified}$
                          X
```

The sense of the residual bits marked X is now consistent. They are not affected by the relative magnitudes of the respective sequence numbers.

*FIG. 8D*

To code A, the prediction
residual A − B is formed.  1111100011011000000000000000100101 ⟶ A

− 1100100111010100000000001010111101 ⟶ B

1100101000000⎡111111⎤110101101000 ⟶ A − B
                                        X

*FIG. 8E*

ENCODING AND DECODING MAP DATA

CROSS-REFERENCE TO RELATED APPLICATION

This application claims priority to U.S. Provisional Patent Application No. 63/197,245, filed Jun. 4, 2021, the entire contents of which are incorporated herein by reference.

TECHNICAL FIELD

This disclosure relates generally to encoding and decoding map data.

BACKGROUND

Computer systems can be used to generate and display map data. As an example, a computer system can generate a graphical map representing features at a geographical location (e.g., roads, buildings, bodies of water, hills, mountains, etc.). Further, the computer system can display the graphical map to a user using a display device. In some implementations, a graphical map can be displayed to a user according to two dimensions (e.g., using a flat panel display, such as a liquid crystal display or a light emitting diode display). In some implementations, a graphical map can be displayed to a user according to three dimensions (e.g., using a headset or a holographic display).

SUMMARY

In an aspect, a method includes receiving first data representing one or more buildings; generating second data representing the one or more building. Generating the second data includes, for each of the one or more buildings: determining, based on the first data, a plurality of first edges defining an exterior surface of at least a portion of the building, wherein the first edges interconnect at a plurality of first points; encoding, in the second data, information corresponding to the quantity of the first points; encoding, in the second data, an absolute position of one of the first points; for each of the remaining first points, encoding, in the second data, a position of that first point relative to a position of at least another one of the first points. The method also includes outputting the second data.

Implementations of this aspect can include one or more of the following features.

In some implementations, the information corresponding to the quantity of the first points can include a numerical value representing the quantity of the first points minus a first constant value.

In some implementations, the first constant value can be three.

In some implementations, generating the second data can include, for at least one of the one or more buildings: determining, based on the second data, a plurality of second edges defining one of the void regions of at least the portion of that building, where the second edges interconnect at a plurality of second points; encoding, in the second data, information corresponding to the quantity of the second points; encoding, in the second data, an absolute position of one of the second points; and for each of the remaining second points, encoding, in the second data, a position of that second point relative to a position of at least another one of the second points.

In some implementations, the information corresponding to the quantity of the second points can include a numerical value representing the quantity of the second points minus a second constant value.

In some implementations, the second constant value can be three.

In some implementations, generating the second data can further include, for at least one of the one or more buildings: encoding, in the second data, information indicating a height of at least a portion of that building.

In some implementations, generating the second data can further include, for at least one of the one or more buildings: encoding, in the second data, information indicating one or more materials of at least a portion of that building.

In some implementations, the one or more buildings can include a first building and a second building. Generating the second data can include determining, based on the first data, that an exterior surface of the first building coincides with an exterior surface of the second building; and encoding, in the second data, an indication that the exterior surface of the first building coincides with an exterior surface of a second building.

In some implementations, the one or more buildings can include a first building and a second building. Generating the second data can include determining, based on the first data, that one of the first points associated with the first building coincides with one of the first points associated with the second building; and encoding, in the second data, an indication that that one of the first points associated with the first building coincides with one of the first points associated with the second building.

In some implementations, the absolute position of one of the first points can be encoded according to one or more quantization scales.

In some implementations, the one or more quantization scales can include a first quantitation scale corresponding to a first spatial dimension, and a second quantization scale corresponding to a second spatial dimension different from the first spatial dimension.

In some implementations, generating the second data can include, for each of the one or more buildings: encoding, in the second data, an identifier associated with that building.

In some implementations, each of the identifiers can include: a first portion indicating a group with which that building is associated, and a second portion indicating a sequential number assigned to that building within the group.

In some implementations, for each of the identifiers, the first portion of that identifier can precede the second portion of that identifier.

In some implementations, the one or more buildings can include a plurality of buildings. Encoding the identifiers associated with the plurality of buildings can include: generating a sequentially sorted list of the identifiers; encoding, in the second data, the first identifier in the sequentially sorted list; and for each of the remaining identifiers in the sequentially sorted list, encoding, in the second data, a difference between (ii) that identifier and (ii) the identifier preceding that identifier in the sequentially sorted list.

In some implementations, the one or more buildings can include a plurality of buildings. Encoding the identifiers associated with the plurality of buildings can include generating a sequentially sorted list of the identifiers; encoding, in the second data, the first identifier in the sequentially sorted list; and for each of the remaining identifiers in the sequentially sorted list: performing a bitwise XOR operation on (i) that identifier and (ii) the identifier preceding that identifier in the sequentially sorted list.

In some implementations, encoding the identifiers associated with the plurality of buildings can include, for each of the remaining identifiers in the sequentially sorted list: determining that that an output of the bitwise XOR operation is less than or equal to a largest number that can be presented using the second portion of that identifier; and in response, encoding, in the second data, a difference between (i) that identifier and (ii) the identifier preceding that identifier in the sequentially sorted list.

In some implementations, encoding the identifiers associated with the plurality of buildings can include, for each of the remaining identifiers in the sequentially sorted list: determining that an output of the bitwise XOR operation is greater than a largest number that can be presented using the second portion of that identifier; and in response, encoding, in the second data, a difference between (i) that identifier and (ii) a modified version of the identifier preceding that identifier in the sequentially sorted list.

In some implementations, the modified version can be generated by setting the second portion of the identifier preceding that identifier in the sequentially sorted list to a sequence of zeros.

In some implementations, the method can include generating, based on the second data, a graphical map including a graphical representation of each of the one or more buildings.

Other implementations are directed to systems, devices, and non-transitory, computer-readable media having instructions stored thereon, that when executed by one or more processors, causes the one or more processors to perform operations described herein.

The details of one or more embodiments are set forth in the accompanying drawings and the description below. Other features and advantages will be apparent from the description and drawings, and from the claims.

BRIEF DESCRIPTION OF DRAWINGS

FIG. 8A-8D are diagrams showing an example process for encoding a set of identifiers.

FIG. 8E is a diagram of example prediction residuals generated using a process different from the process shown in FIGS. 8A-8D.

DETAILED DESCRIPTION

Overview

Figure 1:
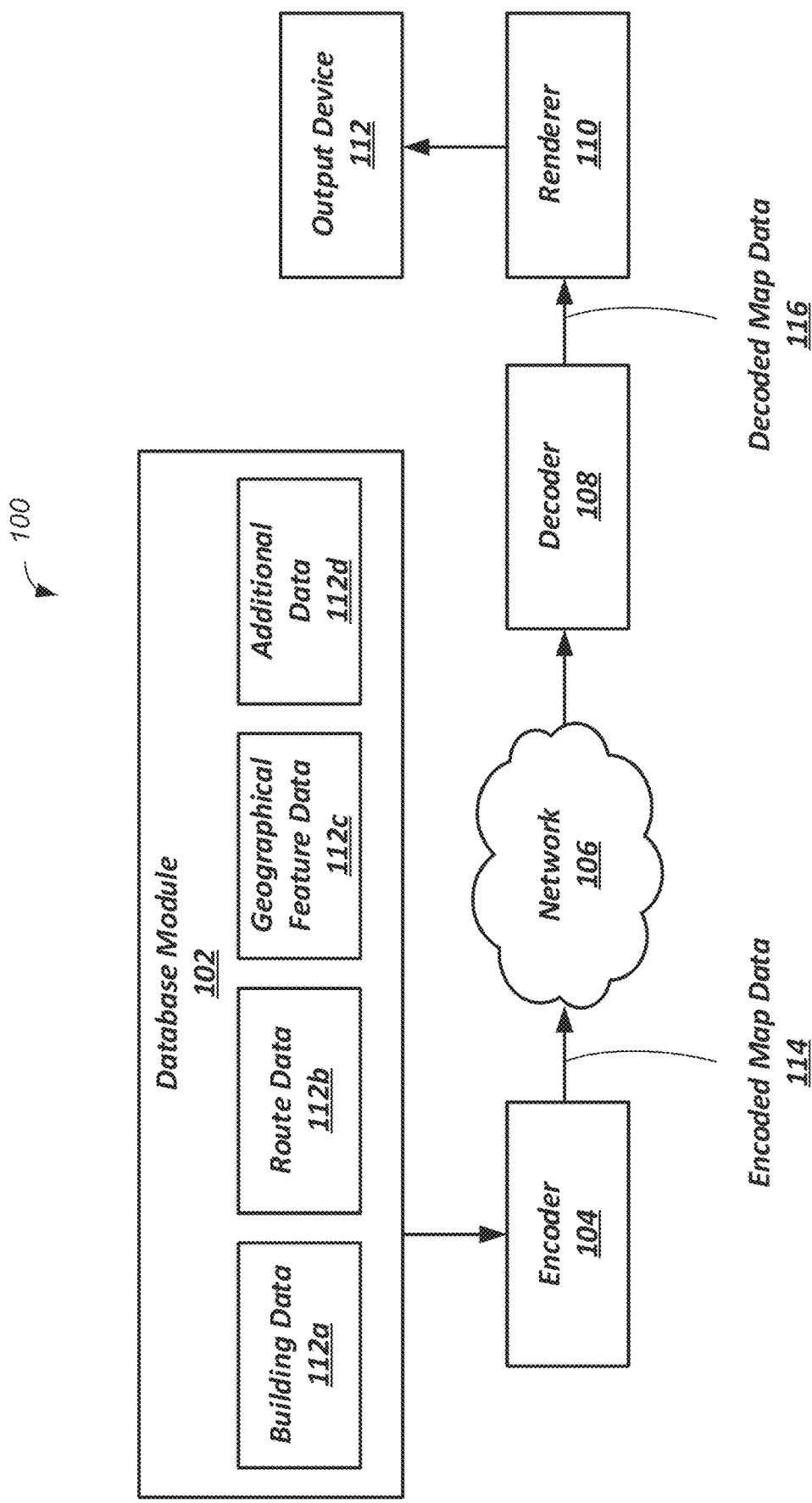
FIG. 1 is a diagram of an example system for processing map data.

In general, computer systems can generate map data regarding a geographical location, and present the map data to one or more users.

For instance, a computer system can generate a graphical map that represents one or more features of a geographical location. As examples, the graphical map can include graphical representations of one or more routes (e.g., roads, streets, paths, railways, etc.), buildings, geographical features (e.g., bodies of water, hills, mountains, etc.), and/or other features at the geographical location.

Further, the computer system can render the graphical map, such that it can be viewed by a user on a display device. For example, the computer system can render a graphical map in two dimensions, such that the graphical map is suitable for display on a two-dimensional display (e.g., a flat panel display, such as a liquid crystal display or a light emitting diode display). As another example, the computer system can render a graphical map in three dimensions, such that the graphical map is suitable for display on a three-dimensional display (e.g., a holographic display or a headset).

In some implementations, a first computer system can encode, in the map data, information regarding one or more buildings at a geographical location. For instance, the first computer system can encode, for each building, one or more identifiers associated with that building (e.g., such that the building can be uniquely identified from among several buildings), information regarding the location of the building, and information regarding the physical characteristics of that building. As an example, the encoded information can indicate the locations and shapes of one or more outlines or closed polylines (e.g., a series of connected line segments) representing the exterior footprint of the building. As another example, the encoded information can indicate the locations and shapes of one or more outlines representing void areas within the building (e.g., holes or gaps along an interior the building). As another example, the encoded information can indicate the height of one or more portions of the building.

Further, the first computer system can provide the map data to a second computer system. The second computer system can decode the map data to extract the encoded information, and generate a graphical map based on the extracted information. In some implementations, the graphical map can include graphical representations of one or more buildings at the location. As an example, the graphical map can include a two-dimensional representation of each of the buildings (e.g., a visual representation of the building according an overhead view). As another example, the graphical map can include a three-dimensional representation of each of the buildings (e.g., a visual representation of the building according a perspective view, such as a three-dimensional model).

In some implementations, a computer system can encode map data using one or more specific techniques (e.g., as described in further detail below), such that the map data can be generated and stored with a higher degree of efficiency than might overview be possible absent performance of these techniques. As an example, map data can be encoded such that the map data has a smaller size (or length) compared to map data encoded using other techniques. This enables computer systems to reduce the amount of resources that are expended to transmit, store, and/or process the map data. For instance, these techniques can reduce an expenditure of computational resources (e.g., CPU utilization), network resources (e.g., bandwidth utilization), memory resources, and/or storage resources by a computer system in generating, storing, transmitting, and processing graphical maps. Further, in some implementations, these techniques also enable computer systems to transmit, store, and/or process the map data more quickly, such that the delay and/or latency with which graphical maps are displayed to a user is reduced.

FIG. 1 is a diagram of an example system 100 for processing map data. The system 100 includes a database module 102, an encoder 104, a network 106, a decoder 108, a renderer 110, and an output device 112.

During an example operation of the system 100, the database module 102 stores information regarding a geographical location. The information stored in the database module 102 can be used to generate a graphical map representing one or more features of the geographical location. In some implementations, at least some the information stored in the database module 102 can be obtained using sensors configured to measure properties of the geographical location and/or retrieved from commercial maps databases.

The database module 102 can store building data 112a regarding one or more buildings at the geographical location. In some implementations, the building data 112a can include one or more identifiers associated with each of the buildings (e.g., such that each building can be uniquely identified from among several buildings). In some implementations, the building data 112a can include information regarding the location of each of the buildings (e.g., one or more sets of geographical coordinates, such as sets of latitudes and longitudes). In some implementations, the building data 112a can include information regarding the physical characteristics of each of the buildings. As an example, the building data 112a can indicate the locations and shapes of one or more outlines representing the exterior footprint (e.g., the outer periphery) of each of the buildings. As another example, the building data 112a can indicate the locations and shapes of one or more outlines representing void areas within the building (e.g., holes or gaps along an interior the building). As another example, the building data 112a can indicate the height of one or more portions of the building. As another example, the building data 112a can indicate the material composition of each of the buildings (e.g., wood, concrete, metal, glass, stone, etc.). As another example, the building data 112a can indicate a visual appearance of each the buildings, such as the building's color and/or pattern.

The database module 102 can also store route data 112b regarding one or more transportation routes at the geographical location. For example, the route data 112b can indicate the locations, paths, and dimensions of one or more roads, streets, railways, waterways (e.g., canals), and/or other transportation infrastructure at the geographical location, and the interconnections between them.

The database module 102 can also store geographical feature data 112c regarding one or more naturally occurring features at the geographical location. For example, the geographical feature data 112c can indicate the locations, shapes, dimensions, and/or topographies of one or more oceans, lakes, rivers, hills, mountains, valleys, plants, and/or any other naturally occurring features at the geographical location.

The database module 102 can also store additional data 112d regarding any other aspect of the geographical location. For example, the additional data 112d can indicate the locations and paths of one or more geographic boundaries (e.g., borders separating different cities, counties, states, countries, etc.). As another example, the additional data 112d can indicate the weather, temperature, traffic, and/or other dynamic information regarding the geographical location.

The database module 102 provides at least a portion of the stored information to the encoder 104. The encoder 104 generates encoded map data 114 based on the information received from the database module 102. The encoded map data 114 includes encoded information regarding a particular geographical location, and enables computer systems (e.g., the system 100 or another system) to generate a graphical map of the geographical location. As an example, the encoded map data 114 can include one or more data structures (e.g., bit streams, data fields, flags, etc.) that indicate characteristics of the buildings, routes, naturally occurring features, or other features of the geographical location.

The encoded map data 114 is provided to a decoder 108 for processing. In some implementations, the encoded map data 114 can be transmitted to the decoder 108 via a network 106. The network 106 can be any communications networks through which data can be transferred and shared. For example, the network 106 can be a local area network (LAN) or a wide-area network (WAN), such as the Internet. The network 106 can be implemented using various networking interfaces, for instance wireless networking interfaces (e.g., Wi-Fi, Bluetooth, or infrared) or wired networking interfaces (e.g., Ethernet or serial connection). The network 106 also can include combinations of more than one network, and can be implemented using one or more networking interfaces.

The decoder 108 receives the encoded map data 114, and extracts information regarding the geographical location included in the encoded map data 114 (e.g., in the form of decoded map data 116). For example, the decoder 108 can extract information regarding the buildings, routes, geographical features, or other features of the geographical location.

The decoder 108 provides the decoded map data 116 to the renderer 110. The renderer 110 renders visual content based on the decoded map data 116, and presents the rendered visual content to a user using the output device 112. As an example, the renderer 110 can generate a graphical map representing the geographical location. Further, the renderer 110 can include, in the graphical map, graphical representations of one or more of the buildings, routes, and/or geographical features at the geographical locations. For example, the graphical map can include one or more two-dimensional shapes and/or three-dimensional models representing the buildings, routes, and/or geographical features at the geographical locations. Further, the graphical representations can be arranged relative to one another in the graphical map based on their positions relative to one another at the geographical location.

In some implementations, at least some of the elements of the graphical map can be rendered according to common spatial scale (e.g., such that the apparent size of each of the elements in the graphical map is proportional to the size of the corresponding features in the geographical environment). In some implementations, at least some of the elements of the graphical map can be rendered according to different spatial scales (e.g., to emphasize and/or deemphasize particular features in the geographical environment). Further, the renderer 110 can use the output device 112 to represent the graphical map, in two-dimensional or three-dimensional view, as appropriate to a user.

Figure 2:
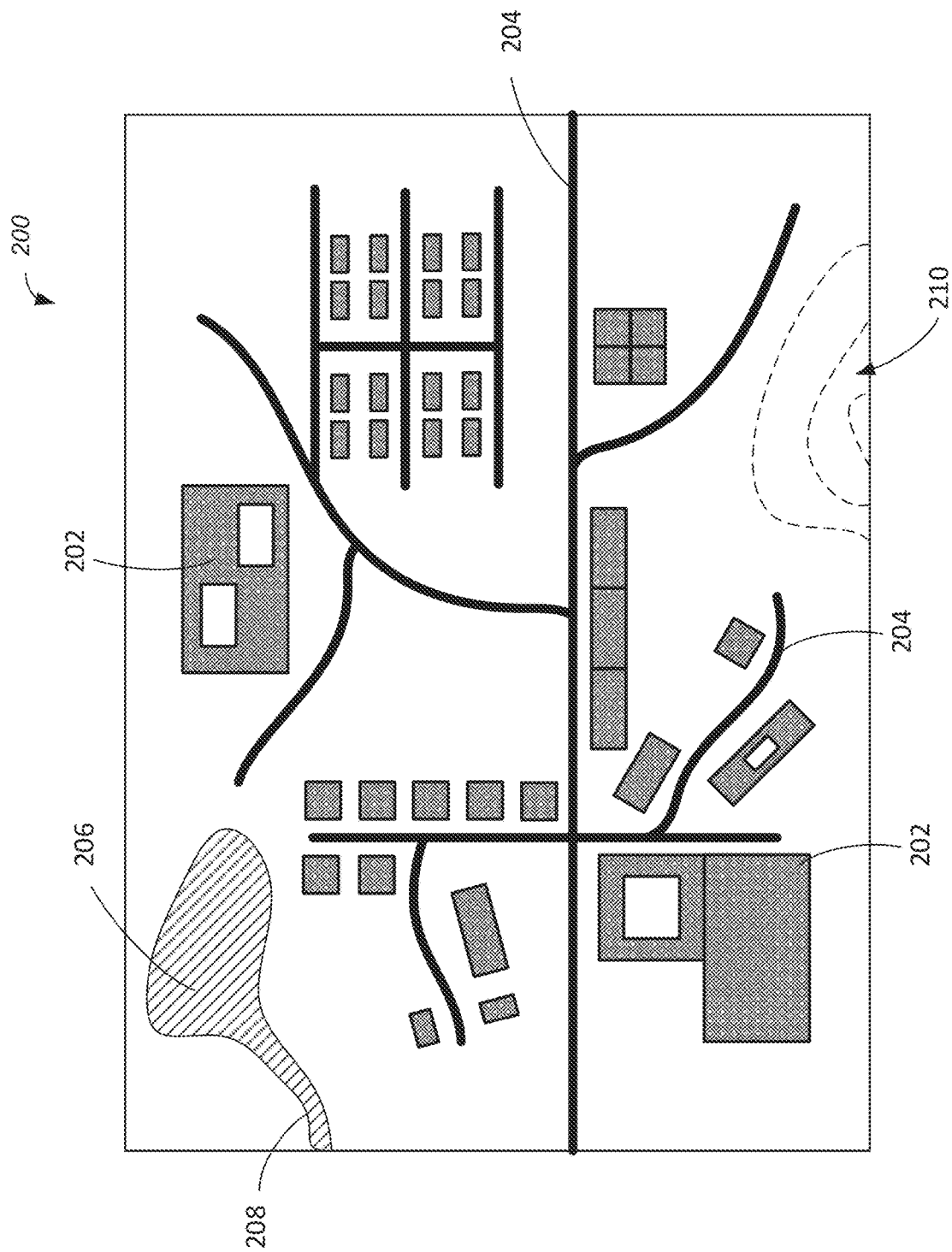
FIG. 2 is a diagram of an example graphical map.

FIG. 2 shows an example graphical map 200 that can be generated by the system based on the information stored in the database module 102. The graphical map 200 can include graphical representations of features of a particular geographical location, including one or more buildings 202, routes 204 (e.g., roads, streets, paths, etc.), and geographical features (e.g., one or more lakes 206, rivers 208, and mountains 210). In some implementations, a graphical map 200 can be partitioned into one or more map tiles (e.g., each map tile representing a different respective portion of the geographical location).

A graphical map 200 can be rendered according to different perspectives or views. For example, as shown in FIG. 3A, a graphical map 200 can be rendered according to an overhead view (e.g., such that the vertical z-dimension appears to extend outward from the page). The overhead view can show, for example, the exterior footprint (e.g., the outer periphery) and interior void areas of one or more buildings projected onto a two-dimensional plane.

Figure 3B:
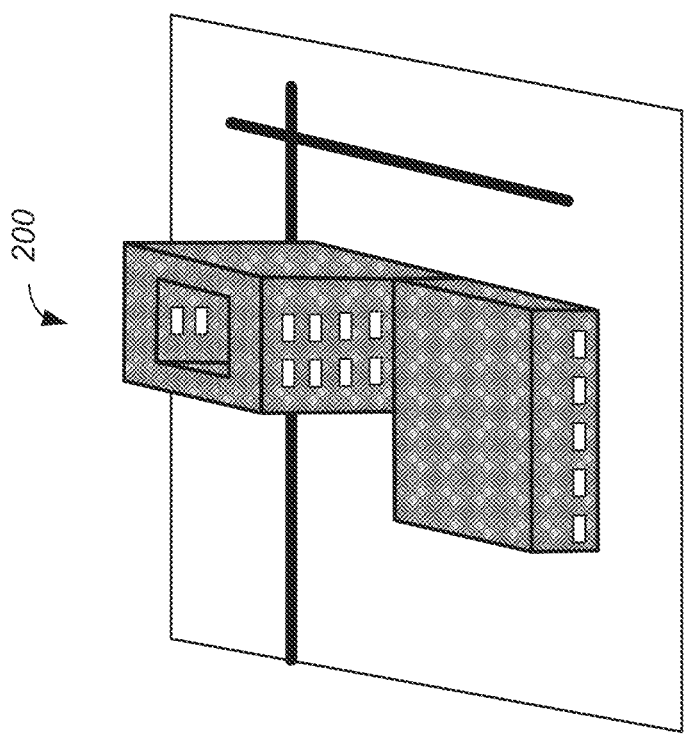
FIG. 3B is a diagram of example graphical map rendered according to a perspective view.
Figure 3A:
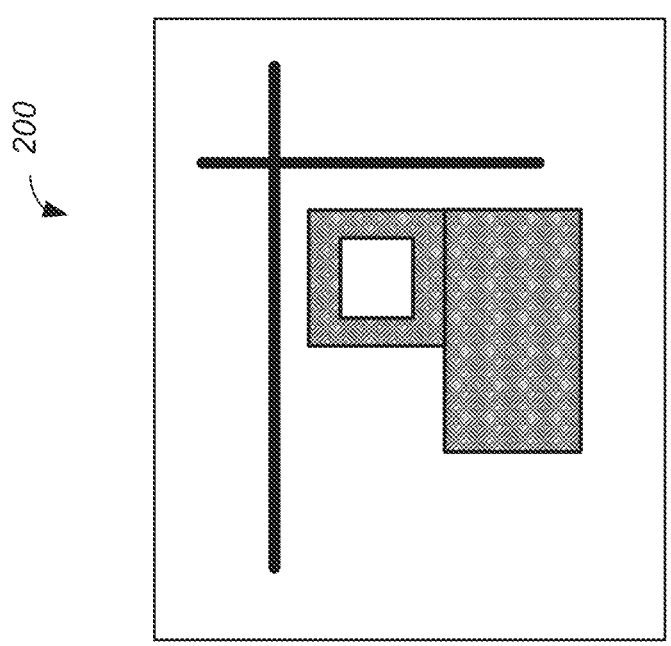
FIG. 3A is a diagram of example graphical map rendered according to an overhead view.

As another example, as shown in FIG. 3B, a graphical map 200 can be rendered according to a perspective view (e.g., such that the x-, y-, and z-dimensions are rendered according to an isometric projection). This technique can be beneficial, for example, as it enables a user to visually ascertain the height of the features depicted in the graphical map 200.

As described above, in some implementations, a computer system can encode map data using one or more specific techniques, such that the map data can be generated and stored with a higher degree of efficiency than might overview be possible absent performance of these techniques. As an example, map data can be encoded such that the map data has a smaller size (or length) compared to map data encoded using other techniques.

As an example, a computer system can encode information regarding one or more buildings at a geographical location. For each building, the encoded information can include an identifier that uniquely identifies the building among several buildings. Further, for each building, the encoded information can include information regarding the location of the building. Further, for each building, the encoded information can include information regarding the physical characteristics of that building, such as the exterior footprint of the building, one or more void areas within the building, and the height of one or more portions of the building. Further, for each building, the encoded information can include information regarding the visual appearance of the building, such as information regarding the material composition of the building, a color of the building, a texture or pattern of the building, etc.

In some implementations, at least some of the information regarding a building can be stored in the form of a list. For example, each building can be associated with a respective list of data items. Each data item on the list can indicate a particular feature or characteristic of the building.

In some implementations, the location of a building and the shape of that building can be indicated using several points that define one or more outlines. At least one of the outlines can define the location and shape of an exterior footprint of the building (or a portion thereof). Further, in some implementations, one or more outlines can define a location and shape of one or more void areas within the building (or a portion thereof).

Figure 4:
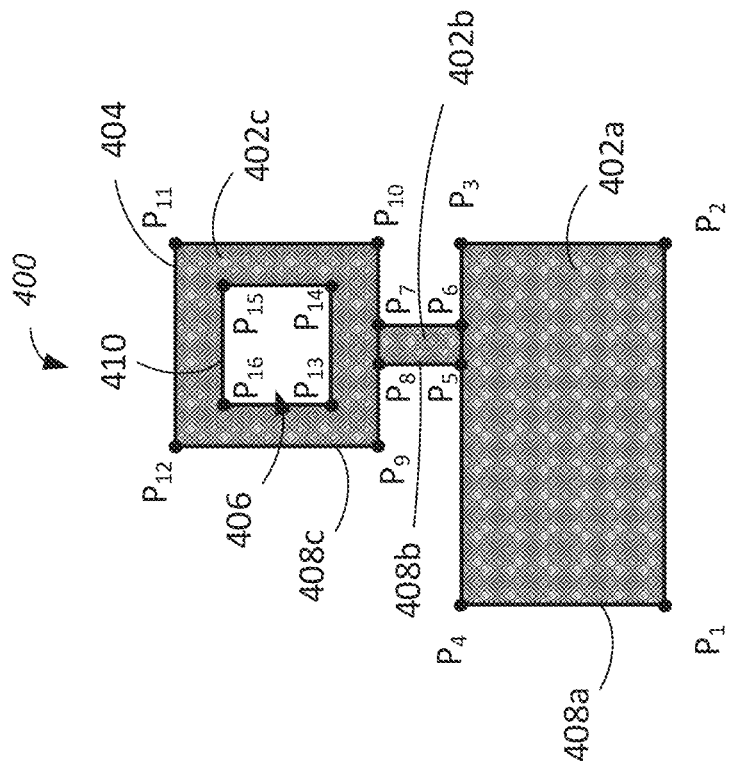
FIG. 4 is a diagram of an example building, including example outlines that define an exterior footprint of the building and a void area.

As an example, FIG. 4 shows an overhead view of an example building 400. The building 400 includes three polygonal portions 402a-402c that collectively define a polygonal exterior footprint 404. Further, the building 400 includes a void area 406 within its exterior footprint 402 (e.g., an interior courtyard within the portion 402c).

For each of the portions 402a-402c, the location and shape of that portion can be encoded by specifying a sequence of points that define an outline coinciding with (or otherwise approximately) the periphery of that portion.

For example, the periphery of the portion 402a defines a polygonal outline 408a having vertices $P_1$, $P_2$, $P_3$, and $P_4$. An encoder (e.g., the encoder 104) can include, in the encoded map data 114, data representing the number of vertices $P_1$, $P_2$, $P_3$, and $P_4$ (e.g., four), the sequential order of the vertices (e.g., such that the outline 408a is formed when the vertices are interconnected in that order), and the location of each of the vertices.

In some implementations, the number of vertices can be encoded by specifying that numerical value in the encoded map data 114. Upon decoding the numerical value in the encoded map data 114, a decoder (e.g., the decoder 108) can parse the encoded map data 114 for data regarding the specified number of vertices. For example, if an outline is defined by four vertices, a numerical value of four can be included in the encoded map data 114 for that outline. Upon decoding this numerical value, a decoder can parse the encoded map data 114 for data regarding four vertices.

In some implementations, the number of vertices can be encoded by specifying the number of vertices minus a constant value (e.g., three). Upon decoding the value specified in the encoded map data 114, the decoder can re-add the constant value to the specified value (e.g., to determine the number of vertices), and parse the encoded map data 114 for data regarding the determined number of vertices. For example, if an outline is defined by four vertices, a numerical value of one can be included in the encoded map data 114 for that outline (e.g., four minus three). Upon decoding this numerical value, a decoder can re-add the constant value (e.g., one plus three), and parse the encoded map data 114 for data regarding four vertices.

This technique can be beneficial, for example, in reducing the number of bits that are used to represent the number of vertices in the outline. For instance, at least three vertices are used to form a polygonal outline. Accordingly, in at least some implementations, the number of vertices can be specified using a shorter bit length (e.g., compared encoding the actual number of vertices). As an example, if an outline has four vertices, the numerical value 4 can be encoded as a binary value of 100 (e.g., having a bit length of 3). However, the numerical value of 1 (e.g., four minus three) can be encoded as a binary value of 1 (e.g., having a bit length of 1).

Further, although the outline 408a includes a segment extending from the last vertex in the sequence (e.g., the vertex $P_4$) back to the first vertex in the sequence (e.g., the vertex $P_1$), the vertex $P_1$ need not be expressly encoded again at the end of the sequence. Instead, a decoder (e.g., the decoder 108) can be configured to recognize that, upon reaching the end of a sequence of vertices, a completed outline is formed by interconnecting the last vertex in the sequence to the first vertex in the sequence. This technique can be beneficial, for example, in reducing the size of data that is used to represent the outline.

For example, the periphery of the portion 402a defines a polygonal outline 408a having vertices $P_1$, $P_2$, $P_3$, and $P_4$. The outline 408a can be encoded by specifying the order of the vertices $P_1$, $P_2$, $P_3$, and $P_4$, and the location of each of these vertices. Upon decoding the information in the encoded map data, a decoder 108 can generate an outline having a segment interconnecting the vertices $P_1$ and $P_2$, a segment interconnecting the vertices $P_2$, and $P_3$, a segment interconnecting the vertices $P_3$, and $P_4$, and a segment interconnecting the vertices $P_4$, and $P_1$, Information regarding the other portions of the building 400 can be encoded in a similar manner as described above with reference to the portion 402a.

For example, the periphery of the portion 402b defines a polygonal outline 408b having vertices $P_5$, $P_6$, $P_7$, and $P_8$. A encoder can include, in the encoded map data 114, data representing the number of vertices $P_5$, $P_6$, $P_7$, and $P_8$ (e.g., either the numerical value four, or the numerical value four minus a constant value), the order of the vertices (e.g., such that when the vertices are interconnected in that order, they form the outline 408b), and the location of each of the vertices.

As another example, the periphery of the portion 402c defines a polygonal outline 408c having vertices $P_9$, $P_{10}$, $P_{11}$, and $P_{12}$. A encoder can include, in the encoded map data 114, data representing the number of vertices $P_9$, $P_{10}$, $P_{11}$, and $P_{12}$ (e.g., either the numerical value four, or the numerical value four minus a constant value), the order of the vertices (e.g., such that when the vertices are interconnected in that order, they form the outline 408c), and the location of each of the vertices.

In some implementations, the location of each vertex can be specified using geographical coordinates (e.g., latitude and longitude). Further, in some implementations, the location of each vertex can be specified independent from the locations of the other vertices. For example, the absolute location of each vertex can be specified using respective sets of geographical coordinates.

In some implementations, the location of at least some of the vertices can be specified relative to the location of another vertex. For example, for a sequence of vertices, the absolute location of the first vertex can be specified using geographical coordinates. For each of the remaining vertex in the sequence, the location of that vertex can be specified relative to the location of the previous vertex in that sequence.

For example, a sequence of vertices can include a vertex $P_1$ located at absolute coordinates (100,100), a vertex $P_2$ located at absolute coordinates (100,200), a vertex $P_3$ located at absolute coordinates (200,200), and a vertex $P_4$ located at absolute coordinates (200,100). The absolute location of the vertex $P_1$ can be encoded in the encoded map data 114. Further, the location of the vertex $P_2$ relative to the vertex $P_1$ (e.g., relative coordinates (0,100)) can be encoded in the encoded map data 114. Further, the location of the vertex $P_3$ relative to the vertex $P_2$ (e.g., relative coordinates (100,0)) can be encoded in the encoded map data 114. Further, the location of the vertex $P_4$ relative to the vertex $P_3$ (e.g., relative coordinates (0, −100)) can be encoded in the encoded map data 114.

This technique can be beneficial, for example, in reducing the number of bits that are used to represent the locations of vertices in an outline. For instance, absolute coordinates can span a relatively wide range of numerical values. However, the differences between the coordinates of vertices in an outline may be relatively smaller (e.g., as the vertices for a particular building are generally relatively close together). Accordingly, the relative locations of vertices can, in some implementations, be stored using a smaller number of bits compared to the number of bits required to store the absolute position of those vertices.

In some implementations, geographical coordinates can also be encoded according to a quantization scale. For example, a quantitation scale can include a sequence of discrete quantized values $0, n_1, \ldots, n_i$, where 0 represents a minimum value that can be represented using the scale and $n_i$ represents a maximum value that can be represented using the scale. The geographical coordinates can be expressed according to the quantization scale (e.g., by determining the quantized value that most closely approximates each of the geographical coordinates). Further, the quantization scale used to encode the geographical coordinates can be signaled to a decoder, such that the decoder can determine the geographical coordinates based on the encoded data (e.g., by multiplying the values in the encoded map data by a particular scaling value). This technique can be beneficial, for example, in reducing the size of data that is used to represent sets of geographical coordinates. In some implementations, the quantization scale can have a scaling factor that is a power of two value (e.g., to reduce the number of bits that are used to encode geographical coordinates by one or more bits).

In some implementations, two outlines may share one or more common vertices and/or edges. In these cases, the encoder can indicate this commonality in the encoded map data 114, and refrain to including duplicative information regarding the common vertices and/or edges in the encoded map data 114. For example, if two outlines include a common vertex, the encoder can include information regarding the first outline (e.g., including the sequence and locations of each of the first outline's vertices) in the encoded map data 114, as described above. Further, when encoding information regarding the second outline, the encoder can indicate that the common vertex is also included in the second outline, and refrain from re-including information regarding the common vertex a second time in the encoded map data 114. Based on this information, a decoder can retrieve information regarding the common vertex specified in connection with the first outline, and use the same information to generate map data regarding the second outline.

As described above, a building can also include one or more void areas, such as holes or gaps along an interior the building that would be visible for an overhead view. Example void areas include courtyards, open air atria, and/or other unroofed portions of the building. An encoder can also encode in information regarding the location and shapes of these void areas in the encoded map data 114.

For instance, in the example shown in FIG. 4, the building includes a void area 406 within its exterior footprint 402. The location and shape of the void area 406 can be encoded by specifying a sequence of points that define an outline coinciding with (or otherwise approximately) the periphery of the void area 406.

For example, the periphery of the void area 406 defines a polygonal outline 410 having vertices $P_{13}$, $P_{14}$, $P_{15}$, and $P_{16}$. An encoder (e.g., the encoder 104) can include, in the encoded map data 114, data representing the number of vertices $P_{13}$, $P_{14}$, $P_{15}$, and $P_{16}$ (e.g., four), the sequential order of the vertices (e.g., such that the outline 410 is formed when the vertices are interconnected in that order), and the location of each of the vertices.

In some implementations, the number of vertices can be encoded by specifying that numerical value in the encoded map data 114. Upon decoding the numerical value in the encoded map data 114, a decoder (e.g., the decoder 108) can parse the encoded map data 114 for data regarding the specified number of vertices.

In some implementations, the number of vertices can be encoded by specifying the number of vertices minus a constant value (e.g., three). Upon decoding the value specified in the encoded map data 114, the decoder can re-add the constant value to the specified value (e.g., to determine the number of vertices), and parse the encoded map data 114 for data regarding the determined number of vertices.

Further, although the outline 410 includes a segment extending from the last vertex in the sequence (e.g., the vertex $P_{16}$) back to the first vertex in the sequence (e.g., the vertex $P_{13}$), the vertex $P_{16}$ need not be expressly encoded again at the end of the sequence. Instead, a decoder (e.g., the decoder 108) can be configured to recognize that, upon reaching the end of a sequence of vertices, a completed outline is formed by interconnecting the last vertex in the sequence to the first vertex in the sequence.

For example, the void area 406 defines a polygonal outline 410 having vertices $P_{13}$, $P_{14}$, $P_{15}$, and $P_{16}$. The outline 410 can be encoded by specifying the order of the vertices $P_{13}$, $P_{14}$, $P_{15}$, and $P_{16}$, and the location of each of these vertices. Upon decoding the information in the encoded map data, a decoder 108 can generate an outline having a segment interconnecting the vertices $P_{13}$ and $P_{14}$, a segment interconnecting the vertices $P_{14}$ and $P_{15}$, a segment interconnecting the vertices $P_{15}$ and $P_{16}$, and a segment interconnecting the vertices $P_{16}$ and $P_{13}$.

In some implementations, an encoder can include, in the encoded map data 114, data representing the number of outlines that are associated with each building. Further, the encoder can also indicate whether each outline is defines an outer periphery of a building (or a portion thereof) or a void space within a building (or a portion thereof). Upon decoding this information, the decoder can parse the encoded map data 114 for data regarding the specified number of outlines.

In some implementations, the number of outlines can be encoded by specifying that numerical value in the encoded map data 114. Upon decoding the numerical value in the encoded map data 114, a decoder can parse the encoded map data 114 for data regarding the specified number of outlines. For example, if a building is associated with four outlines, a numerical value of four can be included in the encoded map data 114 for that building. Upon decoding this numerical value, a decoder can parse the encoded map data 114 for data regarding four outlines.

In some implementations, the number of outlines can be encoded by specifying the number of outlines minus a constant value (e.g., one). Upon decoding the value specified in the encoded map data 114, the decoder can re-add the constant value to the specified value (e.g., to determine the number of outlines), and parse the encoded map data 114 for data regarding the determined number of outlines. For example, if a building is associated with four outlines, a numerical value of three can be included in the encoded map data 114 for that outline (e.g., four minus one). Upon decoding this numerical value, a decoder can re-add the constant value (e.g., three plus one), and parse the encoded map data 114 for data regarding four outlines.

This technique can be beneficial, for example, in reducing the number of bits that are used to represent the number of outlines that are associated with a building. For instance, each building is associated with at least one outline (e.g., corresponding to the exterior footprint of the building). Accordingly, in at least some implementations, the number of outlines can be specified using a shorter bit length (e.g., compared encoding the actual number of outlines). As an example, if a building has four outlines, the number value 4 can be encoded as a binary value of 100 (e.g., having a bit length of 3). However, the numerical value of 3 (e.g., four minus one) can be encoded as a binary value of 11 (e.g., having a bit length of 2).

In some implementations, an encoder can encode additional information regarding each of the buildings in the encoded map data 114.

As an example, for each building, an encoder can include data representing the height of one or more portions of the building in the encoded map data 114. For instance, for each outline of a building, the encoder can indicate the height of the portion of the building corresponding to that outline. A visual representation of the building can be rendered based on the encoded information (e.g., such that the building appears to have the specified height or heights). In some cases, the encoded height information may be referred to as the "extrusion height" of a building (or a portion thereof), corresponding to the height at which a polygon is extruded above a flat plane (e.g., ground level) to visually represent the building.

In some implementations, the height of a building (or a portion thereof) can be signaled relative to the ground (e.g., a height above ground level).

In some implementations, the height of a building (or a portion thereof) can be signaled relative to the height of a different building (or a different portion of the building). For instance, if a building is associated with multiple outlines, an encoder can encode the height of a first portion of the building (e.g., corresponding to a first outline) relative to the ground. For the remaining portions of the building, the encoder can encode the height of that portion of the building (e.g., corresponding to a respective one of the remaining outlines) relative to the height of the first portion of the building.

As an example, for each building, an encoder can include data representing the material composition of each of the buildings in the encoded map data 114. Example materials include wood, concrete, metal, glass, stone, etc. As another example, for each building, an encoder can include data representing the color or colors of each of the buildings in the encoded map data 114. As another example, for each building, an encoder can include data representing a texture or other visual pattern of each of the buildings in the encoded map data 114. This information can be beneficial, for example, in enabling a renderer to generate a visual presentation of a building according to a greater degree of visual detail or fidelity. For example, based on the information encoded in the encoded map data 114, the renderer can generate a two-dimensional shape or three-dimensional model representing the building, and apply a color and/or texture to the shape or model to mimic the material composition, color, and/or texture of the building.

Illustrative Example

Figure 5:
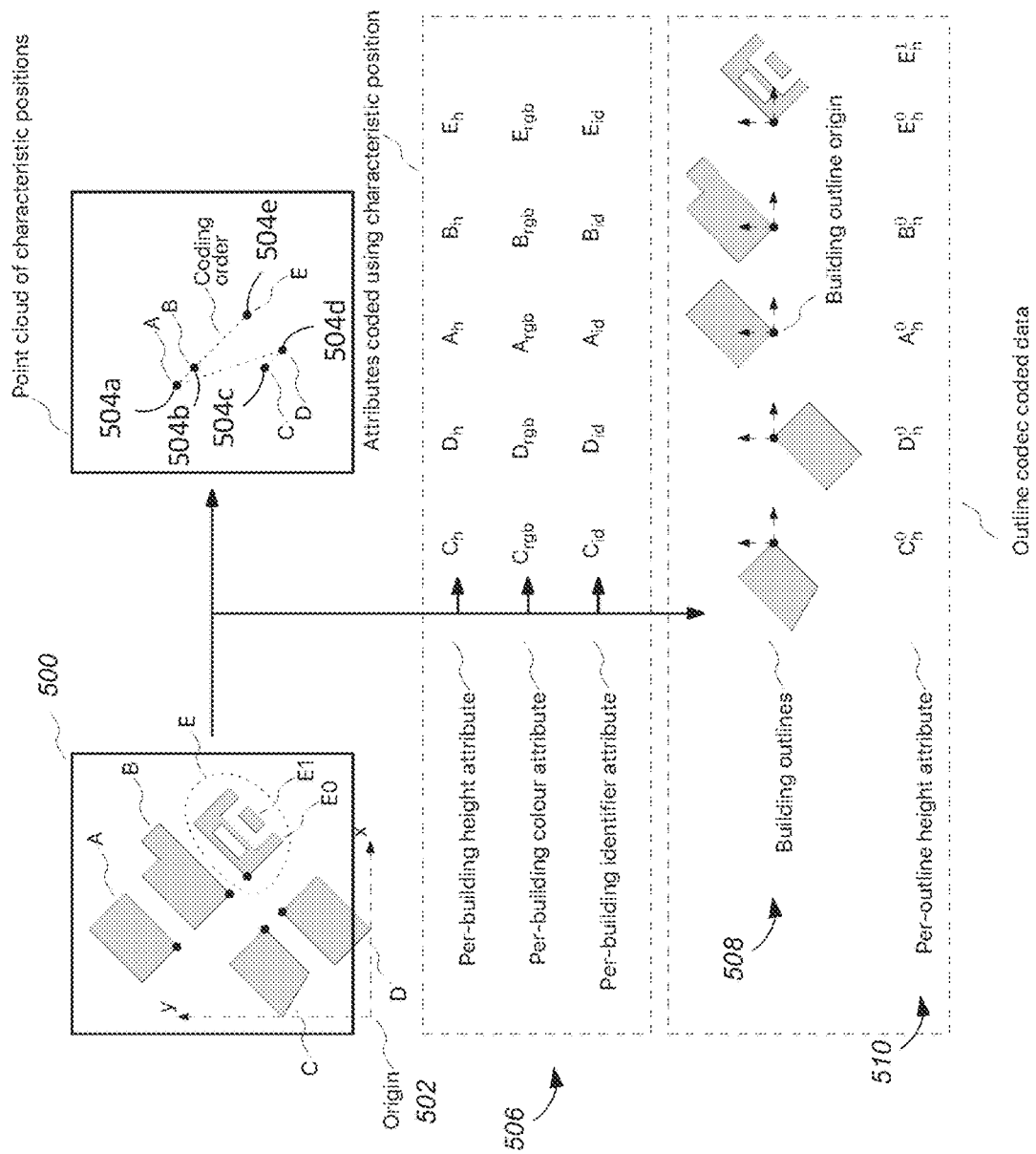
FIG. 5 is a diagram of example building information.

FIG. 5 illustrates how building information can be broken down into constituent parts for efficient representation. FIG. 5 shows an example map tile 500. In some implementations, the map tie 500 can be a portion of a larger graphical map (e.g., the graphical map 200 described with respect to FIG. 2). In this example, the map tile 500 includes buildings A, B, C, D, and E. Buildings A, C, and D each include a single four-vertex outline; building –B includes a single six vertex outline; and building E includes two outlines E0 and E1 of eight and four vertices respectively, the former of which contains a "hole", described by a four-vertex closed polyline (e.g., a series of connected line segments) or ring. Each vertex represents a three-dimensional position in space; however, for the sake of clarity, FIG. 5 shows a 2D plan view, omitting the third, z (elevation), dimension.

By way of nomenclature, outline E1 may be said to be polygon including an exterior closed polyline (or geometric ring), and a single interior closed polyline (or geometric ring). In general, a building outline (polygon) has an exterior closed polyline and zero or more interior closed polylines.

To aid faithful presentation of building data, buildings are permitted to exceed the map tile boundaries. For instance, in the example shown in FIG. 5, the building D partially occurs outside of the map tile 500. If the building outline were forced to be truncated at the map tile boundary, this would create additional vertices to code, while causing potential misrepresentation (e.g., if the adjacent map tile is not simultaneously displayed or rendered).

A local origin 502 is defined for a coordinate system that encompasses the building data. This local origin 502 can be used to ensure that all vertex positions are positive integers with respect to the local origin 502. The coded tile format includes the origin information (e.g., data indicating the location of the local origin 502).

As previously described, the map building data includes information that may be expressed once for each building, and other data that may be expressed once for each outline of each building. The representation and encoding process can be simplified by decomposing the building data into according to these categories.

An example embodiment of such a decomposition transformation proceeds as follows:

1. For each building, according to an order (for example, input order), a characteristic position is determined. The characteristic position may be an arbitrary point, or, in some implementations, it may be the position of a vertex on the exterior closed polyline of one of the building's outlines. This set of ordered positions forms a list representation of a point cloud of characteristic building positions. As an example as shown in FIG. 5, characteristic positions 504a-504e can be determined for the buildings A-E, respectively. The coding order of the characteristic positions 504a-504e are indicated using a dotted line (e.g., beginning at the characteristic position 504c and ending at the characteristic position 504e).

2. Certain per-building attributes (for example, the per-building height attribute of 506) are synthesized from corresponding per-outline attributes. For example, to efficiently exploit correlation of attributes between buildings that also vary on a per-outline basis, a per-building characteristic representation of that attribute can be formed from all of the building's outlines. In some embodiments, the characteristic representation can be formed using the average of a building's per-outline attribute values. In other embodiments, the characteristic representation can be equal to the attribute value of a building's first coded outline. The latter case may be particularly beneficial to implementation design if most buildings are formed of a single outline, and multi-outline buildings are comparatively rare.

3. Per-attribute lists of per-building attributes 506 are collated, according to the same building order. The resulting lists are per-attribute lists of data that may augment the point cloud representation. Examples of collated attributes are the aforementioned synthesized characteristic attributes, and intrinsic per-building attributes such as building identifiers, building colors, flags that control the rendering of buildings in particular display modes, etc., 4. A list of per-building outlines 508, according to the same building order, is formed. In some embodiments, the encoder subtracts a building's characteristic position from each of its vertices.

An encoder can choose to order the outlines of each building to improve compression. An encoder can choose to perform a cyclic permutation of the vertices in each closed polyline in order to improve compression. In some embodiments, the exterior closed polyline of the first outline of a building must contain a vertex coincident with the building's characteristic position. In some embodiments, the first vertex of the exterior closed polyline of the first outline of a building must be coincident with the building's characteristic position.

5. Per-attribute lists of per-building outline attributes 510, according to the same building order and same outline order, are formed. For example, per-outline heights, colors, etc., can be formed. In some embodiments, the encoder subtracts a building's synthesized characteristic attribute value from the corresponding attribute of each of its outlines.

In an example implementation, an encoder can further transform the decomposed data into a compressed data stream as follows:

1. The characteristic building positions (e.g., the characteristics positions 504a-504e) are encoded using a geometry encoder such as those described in U.S. Pat. No. 10,805,646, filed Jun. 21, 2019, entitled "Point Cloud Geometry Compression Using Octrees and Binary Arithmetic Encoding with Adaptive Look-up Tables", the content of which is hereby incorporated by reference. A decoding order is determined, that is, the order in which a decoder will assemble the list of characteristic building positions, which may not necessarily be the same as the input order.

2. The lists of per-building attributes (e.g., the per-building attributes 506) are encoded using an attribute encoder. In some embodiments, the attribute encoder makes use of the characteristic building positions to determine suitable nearest neighbors to predict attribute values and improve compression performance. Examples of such attribute coding techniques are described in U.S. Pat. No. 10,909,727, filed Apr. 10, 2019, entitled "Hierarchical Point Cloud Compression with Smoothing", the content of which is hereby incorporated by reference. Some embodiments can, for certain attributes, employ a different attribute coding method. For instance, building identifiers can be encoded using the identifier compression method described herein.

3. The list of per-building outlines (e.g., the building outlines 508) and lists of per-outline attributes (e.g., the per-outline attributes 510) are encoded according to the methods described herein.

In an example decoder implementation, the compressed data stream is decoded and used to reconstruct the building data as follows:

1. The characteristic building positions are decoded from the compressed data stream and the number of coded buildings present determined.

2. Lists of per-building attributes are decoded using an attribute decoder.

3. The list of per-building outlines and lists of per-outline attributes are decoded and reconstructed according to the methods described herein. In some embodiments, the decoded building outline vertex positions are compensated by adding the building's characteristic position. In some embodiments, the encoder adds a building's synthesized characteristic attribute value to the corresponding attribute of each of its decoded outlines.

The above description describes distinct lists and operations. An implementation that embodies these methods may optimize its execution or memory utilization by reordering, interleaving, eliding, or deferring certain operations with equivalent compressed representations. For example, instead of generating a list of outlines in which vertices are offset by the corresponding building's characteristic position, an implementation can integrate the offsetting into a point prediction process. For example, an implementation can avoid the creation of distinct lists, and can instead use a process to traverse the input data.

Example Syntax and Structure for Outline Coding

In some implementations, building outlines and their attributes can be encoded using the following techniques.

In general, outline coding follows the decoding order determined from the characteristic building positions. The use of this order ensures that a decoder can implicitly identify a building's outlines with its characteristic position and per-building attributes without explicit ordering information being transmitted and incurring a transmission and decoding cost.

The following syntax illustrates the structure of the compressed outline vertex data. The syntax form expresses the structural encoding and decoding operations that are performed to write or read, respectively, the compressed data. It does not directly express or identify computations such as prediction or reconstruction:

```
for each building, b, in decoding order: {
  num_outlines_minus1
  for each outline, o, in building: {
    num_interior_rings
    for each ring, r, in outline: {
      num_vertices_minus3
      for each vertex, v, in ring: {
        if not first vertex of first ring of first outline in building: {
          vertex_residual_x[b][o][r][v]
          vertex_residual_y[b][o][r][v]
          vertex_residual_z[b][o][r][v]
}}}}}
```

The syntax element num_outlines_minus1+1 is the number of outlines present in the building. In general, each building contains at least one outline. Therefore, the minus1 form is used to a) avoid inefficiency from coding an ordinarily impossible value, and b) to avoid implementations having to have a safe behavior should they encounter a bitstream that could indicate such a physically impossible construction.

An embodiment can use context adaptive binary arithmetic coding (CABAC) to code the syntax element num_outlines_minus1, where a first binary symbol using a dedicated adaptive context model indicates whether num_outlines_minus1 is equal to zero and in cases where it is not, num_outlines_minus1−1 is coded using an exponential Golomb code without context modelling, and with, for example, the code parameter k=1. Where buildings with more than one outline are an exceptional case, such an encoding efficiently models the likely case without requiring additional context models for the rarer cases where there is more than one outline in a building.

The syntax element num_interior_rings is the number of rings present in a current outline. In general, each outline contains an exterior ring. Indicating the number of interior rings is therefore the same as indicating the number of rings minus one. Syntactically prohibiting the signaling of an outline with no rings again a) avoids inefficiency from coding an ordinarily impossible value, and b) avoids implementations having to have a safe behavior should they encounter a bitstream that could indicate such a meaningless construction.

An embodiment can use context adaptive binary arithmetic coding (CABAC) to code the syntax element num_interior_rings, where a first binary symbol using a dedicated adaptive context model indicates whether num_interior_rings is equal to zero and in cases where it is not, num_interior_rings−1 is coded using an exponential Golomb code without context modelling, and with, for example, the code parameter k=1. Where outlines with interior ring are an exceptional case, such an encoding efficiently models the likely case without requiring additional context models for the rarer cases where there are interior rings present.

The syntax element num_points_minus3 plus three is the number of vertices that define the ring. In general, at least three vertices are used to represent a two-dimensional volume. Syntactically prohibiting a non-realizable construction simplifies decoder and rendering implementations. While a two-vertex construction could be used to represent partitions or flat walls, such objects may be sufficiently rare. If such a construction is required, an encoder can add additional points to reach the minimum. In some embodiments, the number of vertices can be represented instead by a syntax element num_points_minus4+4, on the basis that triangular buildings or outline segments are very rare, while rectangular buildings are very common, particularly at high map scales; an encoder when encountering a triangular ring can insert a point along one of the edges that does not observably alter the building, for example by introducing a vertex at the mid-point of an existing edge.

An embodiment can use context adaptive binary arithmetic coding (CABAC) to code the syntax element num_points_minus3, or by substitution num_points_minus4. A truncated unary code codes a first part indicating the value of Floor(num_points_minus3/2) with a maximum of 5 binary symbols (bins) using a dedicated adaptive context model per bin. For values of the first part less than five, a single binary symbol is coded as a second part using a dedicated adaptive context model. For values of the first part greater than five, the value of num_points_minus3−10 is coded using an exponential Golomb code without context modelling, and with, for example, the code parameter k=2. An example of the encoding is shown below. Such an encoding allows for efficient representation of common numbers of points per outline, while allowing the context models to adapt to properties of the map data, for instance that a building is more likely to have an even number of corners than an odd number.

| Value | Binary symbols | First part | Second part |
| --- | --- | --- | --- |
| 0, 1 | 0 X | 0 | X |
| 2, 3 | 1 0 X | 1 0 | X |
| 4, 5 | 1 1 0 X | 1 1 0 | X |
| 6, 7 | 1 1 1 0 X | 1 1 1 0 | X |
| 8, 9 | 1 1 1 1 0 X | 1 1 1 1 0 | X |
| 10, 11, 12, 13 | 1 1 1 1 1 0 X X | 1 1 1 1 1 | 0 X X |
| 14 ... 21 | 1 1 1 1 1 1 0 X X X | 1 1 1 1 1 | 1 0 X X X |

The syntax elements vertex_residual_{x,y,z} are the x, y, and z components of the vertex position residuals used to correct a prediction of an individual vertex positions. In some embodiments, the definition of a building's characteristic position is the position of the first vertex in the first ring of the first outline in said building. In such an embodiment, the first vertex in the first ring of the first outline of a building is perfectly predicted by said building's characteristic position, e.g., the vertex residual is zero. Compression efficiency and implementation efficiency may be improved by skipping the coding of the known zero valued residual in this case.

An embodiment can use context adaptive binary arithmetic coding (CABAC) to code the syntax elements vertex_residual_{x,y,z}, using an exponential Golomb code to code the absolute magnitude with, for example, the code parameter k=2. In some embodiments, different code parameters are used for coding z residual component, for example k=1. The binary symbols forming the prefix of the exponential Golomb coded values may be coded using a dedicated adaptive context model per bin. In some embodiments, the same set of context models are used to code the x and y components of the vertex residual, and a different set of context models are used to code the z component of the vertex residual. A sign bit can be coded to indicate the sign of the residuals.

The syntax structure described, through its hierarchical nature, provides an implicit association between the constituent parts of a building. No further side-information is required to reconstruct the associations by a decoder.

Example Syntax and Structure for Per-Outline Attribute Coding

The following syntax illustrates an example structure of the compressed outline attribute data. For the purpose of illustration, in this example, there are three types of per-outline attribute conveyed: a first attribute residual is present in every outline, it is either not predicted from a synthesized per-building attribute value, or the prediction from a synthesized per-building attribute value may generate a non-zero residual; a second and a third attribute residual are not present in the first outline of a building, these attribute values are in this case defined to be equal to a per-building attribute value. In some embodiments, attribute residuals can be in the form of a multi-component value. For example, color residuals can be represented with three color components.

```
for each building, b, in decoding order: {
  for each outline, o, in building: {
    first_attribute_residual[b][o]
    if not first outline in building: {
      second_attribute_residual[b][o]
      third_attribute_residual[b][o]
    }
}}
```

The syntax differs from the compressed outline vertex data syntax by omitting an indication of the number of outlines present in each building. This information would be identical to that conveyed by the vertex data and need not, for efficiency, be repeated. A decoder can make use of the outline counts determined during decoding of the vertex data to correctly decode the attribute syntax.

In some embodiments, an alternative arrangement of the syntax is used to permit extensibility of the coded per-outline attribute types while maintaining backwards compatibility with older decoders. In the following syntax, all values of a per-outline attribute type are coded sequentially. New attribute types can be added at the end of the compressed data without disturbing the ability of older decoders to decode the data they comprehend.

```
for each attribute, a, in per-outline attribute types: {
  for each building, b, in decoding order: {
    for each outline, o, in building: {
      if not first outline in building or if attribute a always has a residual: {
        attribute_residual[b][o][a]
}}}}
```

In some embodiments, the compressed data for a per-outline attribute type is stored in a randomly accessible type-length-value based data unit.

Some embodiments may interleave/merge the outline vertex and attribute syntax structures to require only a single traversal when encoding or decoding:

```
for each building, b, in decoding order: {
  for each outline, o, in building: {
    first_attribute_residual
    if not first outline in building: {
      second_attribute_residual
      third_attribute_residual
    }
    num_interior_rings
    for each ring, r, in outline: {
      ... }}}
```

For any of the syntaxes described, decoding operates by parsing or entropy decoding the syntax element in turn according to the prescribed structure. The syntax elements that indicate the number of outlines, rings, and points instruct the decoder as to how many times to iterate through the respective loops. In some implementations, a decoder may need to allocate or reallocate data storage based upon the indicated length fields. Further, a decoder can inspect any decoded length fields to protect against malformed streams that require large amounts of memory allocation, or large numbers of loop iterations.

Example Prediction Process

In some implementations, the compression of per-outline vertex data can involve prediction to exploit redundancy inherent in the vertex positions rather than simply coding vertex positions directly.

As described previously, the position of a first vertex in the exterior ring of a first outline in a building can be inferred from the building's characteristic position. The following treatment does not generally concern prediction of this value.

Reference is made to FIGS. 6A-6F, depicting the coding of various building outlines. The figures use the following conventions: circles represent the vertices or a ring; a filled circle (disc) represents a vertex coincident with the building's characteristic position; solid lines with arrows represent prediction residuals; solid lines without arrows represent edges forming a ring. Dashed lines represent predictions. Dotted lines represent an inferred edge, formed by adding an edge between the last and first vertices in a ring.

Figure 6A:
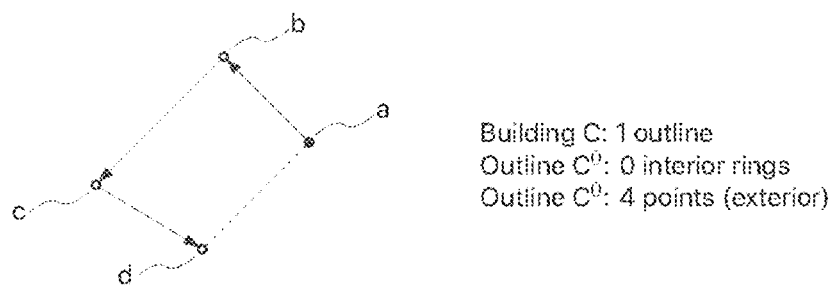
FIGS. 6A-6F are diagrams of example techniques for coding information regarding building outlines.

A differential predictor, as depicted in FIG. 6A, predicts a vertex position $v_i$ as the position of the preceding vertex $v_{i-1}$ in the same ring. For example, the vertex b is predicted from the position vertex a, and similarly, c from b, etc. The vertex prediction residual is therefore $v_i - v_{i-1}$, corresponding to, for example, the vector $\vec{ab}$.

Figure 6B:
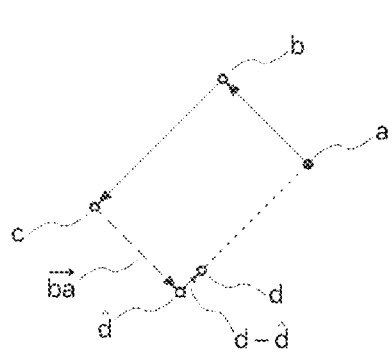

A last vertex predictor, as depicted in FIG. 6B, predicts the position $\hat{v}_L$ of the last vertex $v_L$ in a ring using a combination of the position of the penultimate vertex $v_{L-1}$ and the vector $\vec{v_1 v_0}$ formed from the first two vertices of the same ring. The prediction residual $v_L - \hat{v}_L$ corrects any error between the desired reconstructed vertex position and its predicted position. For example, the last vertex d can be predicted to be $\hat{d}$ by adding the reversed initial edge vector $\vec{ab}$, that is, $\vec{ba} = -\vec{ab}$, to the penultimate vertex c. Such a predictor is useful to compress rectangular buildings, which can be adequately described by two vectors (for instance, $\vec{ab}$ and $\vec{bc}$). In some embodiments, since building outlines (or rings) defined by four vertices tend to be rectangular in nature, this predictor may be automatically enabled for rings comprising four points. Such prediction may still be useful to compress somewhat rectangular buildings with more than four ring vertices where the vector of the last coded edge $\vec{v_{L-1}v_L}$ is approximately equal to the first coded edge $-\vec{v_0v_1}$. To exploit such cases, some embodiments can allow the predictor to be conditionally enabled though the signaling of a prediction mode.

Figure 6C:
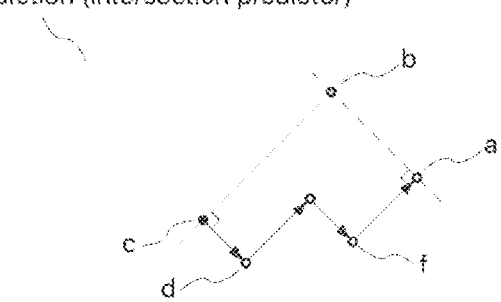

Another last vertex predictor, depicted in FIG. 6C, predicts a position $\hat{v}_L$ of the last vertex $v_L$ in a ring at the intersection of two lines: a first line at right angles to the first edge $\vec{v_0v_1}$ and passing through the first vertex $v_0$; and a second line at right angles to the edge $\vec{v_{L-2}v_{L-1}}$ and passing through the penultimate vertex $v_{L-1}$. For example, the predicted last vertex b is determined from the intersection of the lines at right angles to $\vec{cd}$ and $\vec{fa}$ passing through c and a respectively. Since vertex positions may be three dimensional, the intersection is computed using x, and y components only to avoid an underdetermined system. The third, z, component may be predicted as the mean of the first and penultimate vertices z component.

Figure 6D:
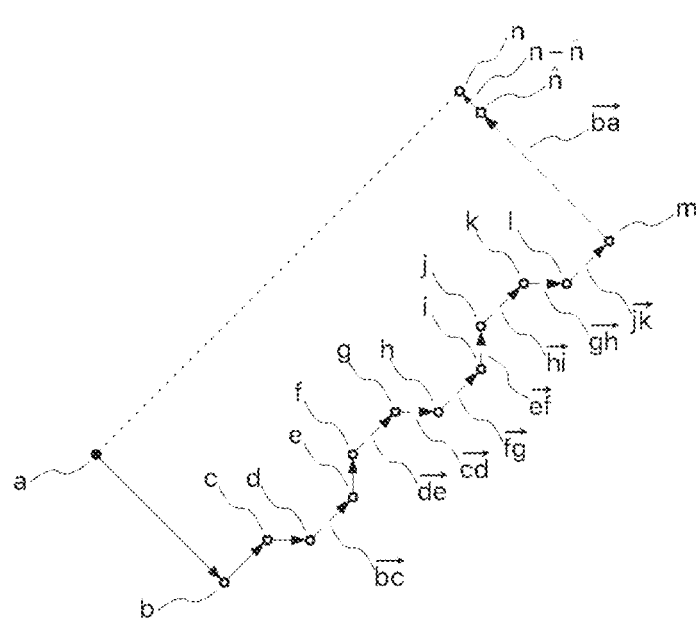

An intra-ring vector predictor, depicted in FIG. 6D, predicts the position of a vertex $v_i$ as $\hat{v}_i$ using the preceding vertex position $v_{i-1}$ and an indicated previous edge vector $\vec{v_{J-1}v_J}$, where $\hat{v}_i = v_{i-1} + \vec{v_{J-1}v_J}$. For example, the vertex e may be predicted as $\hat{e} = d + \vec{bc}$. A prediction residual may be used to compensate for any error $v_i - \hat{v}_i$. The encoder indicates to a decoder which previous edge vector is used for prediction. In some embodiments the index j, or j–1, used to identify the edge vector is conveyed in the compressed data for each predicted vertex position. In some embodiments, the index j, is signaled relative to the index of the last reconstructed vertex prior to predicted vertex, i–1, in order to causally exploit locality of prediction. Vertices $v_i$ with i<2 cannot be predicted using the intra-ring vector predictor since there is no previously coded edge to use as a predictor. For such vertices, a compressed stream should not encode any prediction mode information.

As may be appreciated from FIG. 6D, a building outline (or ring) may contain repeating architectural patterns, such as bay windows, buttresses, or successive staggered parts. While such patterns may be efficiently compressed using intra-ring vector prediction, compression efficiency may be further improved by exploiting the correlation present in the identification of the predicting edge vector. The following table illustrates the prediction structure depicted in FIG. 6D and the relative coding of predicting edge vector $\vec{v_{J-1}v_J}$. By using the closest vector that minimizes i–1–j, variations in the index offsets are observed.

| i | 2 | 3 | 4 | 5 | 6 | 7 | 8 | 9 | 10 | 11 | 12 |
|---|---|---|---|---|---|---|---|---|----|----|----|
| $v_i$ | c | d | e | f | g | h | i | j | k | l | m |
| $\vec{v_{J-1}v_J}$ | | | $\vec{bc}$ | | $\vec{de}$ | $\vec{cd}$ | $\vec{fg}$ | $\vec{ef}$ | $\vec{hi}$ | $\vec{gh}$ | $\vec{jk}$ |
| j | | | 2 | | 4 | 3 | 6 | 5 | 8 | 7 | 10 |
| i – 1 – j | | | 1 | | 1 | 3 | 1 | 3 | 1 | 3 | 1 |

Using a different choice of predicting edge vectors, such that once the whole instance of the repeating structure is has compressed, further instances of the structure start at the beginning of the reference unit, the variation in the index offset may be reduced. The encoder and decoder may further exploit the decrease in index offset entropy by differentially coding each index offset with respect to the previous offset. In some embodiments, zero-run-length coding may be applied to efficiently compress the sequence of $\Delta(i-1-j)$.

| i | 2 | 3 | 4 | 5 | 6 | 7 | 8 | 9 | 10 | 11 | 12 |
|---|---|---|---|---|---|---|---|---|----|----|----|
| $v_i$ | c | d | e | f | g | h | i | j | k | l | m |
| $\vec{v_{J-1}v_J}$ | | | $\vec{bc}$ | | $\vec{bc}$ | $\vec{cd}$ | $\vec{de}$ | $\vec{ef}$ | $\vec{fg}$ | $\vec{gh}$ | $\vec{hi}$ |
| j | | | 2 | | 2 | 3 | 4 | 5 | 6 | 7 | 8 |
| i – 1 – j | | | 1 | | 3 | 3 | 3 | 3 | 3 | 3 | 3 |
| $\Delta(i – 1 – j)$ | | | 1 | | 2 | 0 | 0 | 0 | 0 | 0 | 0 |

While intra-ring predictors may efficiently compress a single building, inter-ring compression may be used to efficiently compress multiple buildings. For example, in urban environments with a high density of buildings per map tile, neighboring buildings are typically very similar in size, shape, orientation, and complexity. Inter-ring prediction exploits this correlation to reduce the compressed data size.

Figure 6E:
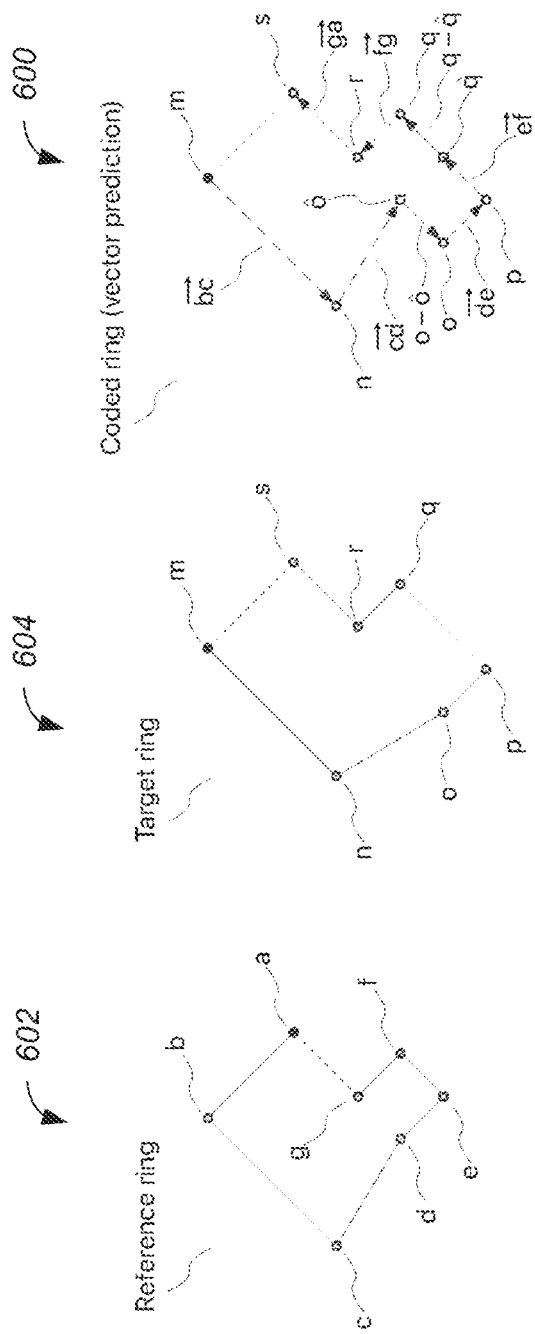

An inter-ring vector predictor 600, depicted in FIG. 6E, predicts the position of a vertex $v_i$ as $\hat{v}_i$ using the preceding vertex position $v_{i-1}$ and an indicated previous edge vector $\vec{v_{J-1}^r v_J^r}$ from an indicated reference ring r, where $\hat{v}_i = v_{i-1} + \vec{v_{J-1}^r v_J^r}$. For example, the compression of the target ring 604 may use the previously compressed reference ring 602. The vertex o is predicted as ô from the preceding vertex n and the vector $\vec{cd}$ in the reference ring, where $\hat{o} = n + \vec{cd}$. A prediction residual may be used to compensate for any error $o - \hat{o}$. The indication of the reference ring may involve the signaling of the (n+1)-th previously coded ring, e.g., the value zero would indicate the previous ring. The indication of the previous edge vector may be performed in the same manner as the edge vector indication in the intra-ring vector predictor.

In some embodiments, a single reference ring is signaled only once per ring where this predictor is used. In some embodiments, the reference ring is signaled for each prediction using a delta encoding method.

In some embodiments, relative signaling of a previous edge vector is performed only once. The same relative offset is then used to identify successive edge vectors with each successive predicted vertex.

Figure 6F:
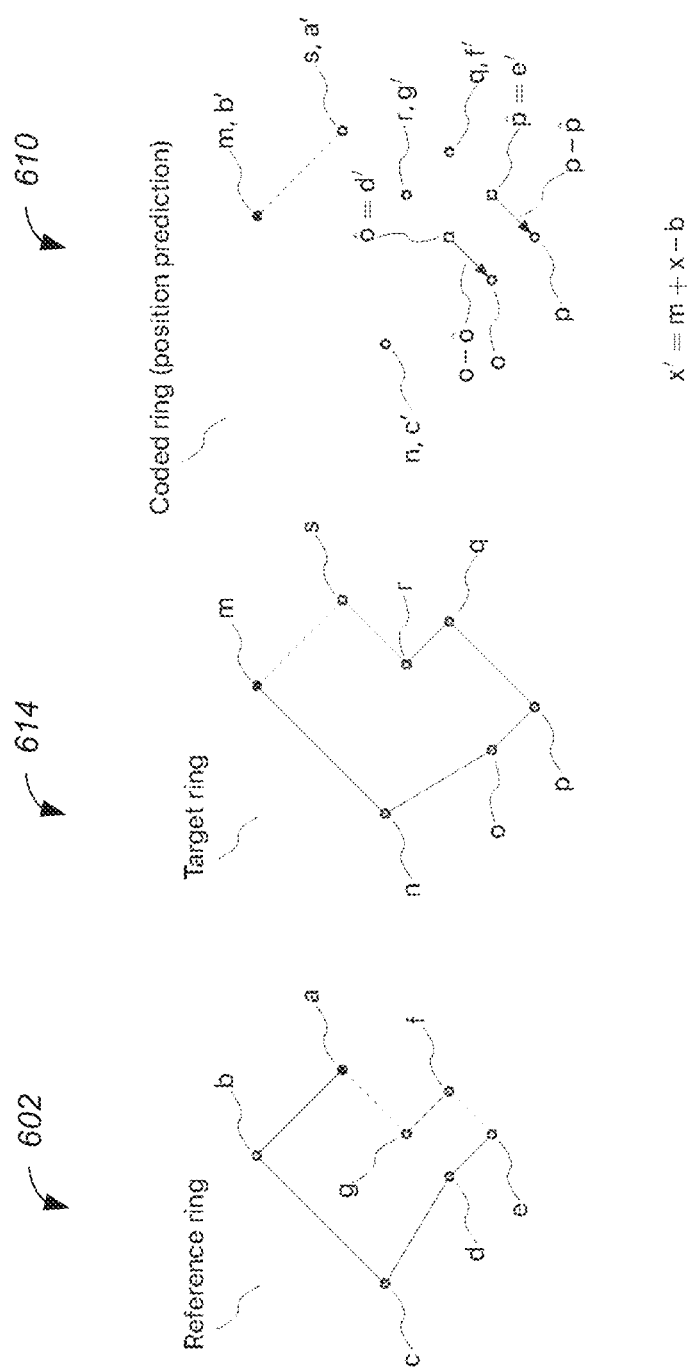

An inter-ring point predictor 610, depicted in FIG. 6F, predicts the position of a vertex $v_i$ as $\hat{v}_i$ using the position of an indicated vertex $v_j^r$ relative to an indicated origin vertex $v_\alpha^r$ in an indicated reference ring, where $\hat{v}_i = v_0 + \vec{v_\alpha^r v_j^r}$, and $v_0$ is the position of the first vertex in the predicted ring. For example, the compression of the target ring 614 may use the previously compressed reference ring 602. The predictor indicates the vertex b as the origin vertex in the reference ring. The vertex o is predicted as ô by indicating vertex d in the reference ring, where $\hat{o} = v_0 + \vec{bd}$. A prediction residual compensates for the error $o - \hat{o}$. The operation $v_0 + \vec{v_\alpha^r v_j^r}$ may be regarded as spatially compensating the reference ring such that all vertices are displaced by $\vec{v_\alpha^r v_0}$ such that the reference origin vertex is coincident with first vertex of the predicted ring.

An indication of a reference ring may be performed in the same manner as the reference ring in the inter-ring vector predictor. An indication of a reference ring origin vertex $v_\alpha^r$ may signal the vertex index a in the reference ring. An indication of a reference vertex $v_j^r$ of may signal the vertex index j in the reference ring. In some embodiments, successive reference vertex indices $j_i$ are differentially coded, ie., $\Delta j_i = j_i - j_{i-1}$. In some embodiments, the successive reference vertex indices $j_i$ are assumed to advance by at least one, ie., $\Delta j_i = j_i - j_{i-1} - 1$, such that the reference vertex naturally proceeds along the reference outline with each successive prediction.

In some embodiments, a single reference ring origin vertex index is signaled only once per ring where this predictor is used. In some embodiments, signaling of a reference vertex index is performed only once per ring and the reference vector index increments with each successive predicted vertex.

In some embodiments, the same single reference ring origin vertex applies to all rings in all outlines of a predicted building, thereby allowing the building relative origin of other rings present in the building to be predicted.

A prediction mode may be signaled once per ring, or once per outline, or once per building. In some embodiments, a prediction mode may be signaled for each predicted vertex.

In certain embodiments of these prediction processes, an encoder is given the choice of disabling the chosen prediction mode for a given vertex and falling back to the differential predictor, or an appropriate last vertex predictor (if any is applicable). This prevents inefficient use of poor prediction.

In some implementations of a decoder, the decoding of a vertex position proceeds by determining the prediction mode, generating a predicted position according to the predictor indicated by the prediction mode, and adding any decoded residual to the predicted position. In some embodiments, the determination of the prediction mode is performed according to the number of points present in a ring, or outline, or building. In some embodiments, the determination of the prediction mode is made according to a value signaled in the compressed data.

Example Quantization and Scaling Techniques

While prediction is an effective tool at eliminating redundancy and reducing the compressed data size, further compression may be achieved by applying quantization to vertices or prediction residuals.

Different degrees of quantization (and scaling) may be applied depending upon the nature of a vertex. For instance, all vertices may be quantized with the same quantizer, the quantization step size being signaled in the compressed data. However, the perception of fidelity may be improved by quantizing prediction residuals differently to the characteristic building positions. For instance, the alignment of buildings due to quantization may become readily apparent and appear unnatural. However, regular grid structure can be disrupted by using less (or no) quantization for the building origin, while applying a higher degree of quantization to the residuals used to generate the outline.

Artifacts arising from to quantization may be further disrupted by applying different degrees of quantization to intra-ring prediction residual compared to inter-ring prediction residuals. A ring predicted with intra-ring prediction may use less (or no) quantization than an inter-predicted ring. By copying higher quality rings using inter-prediction, visual grid-like patterns may be avoided.

Different quantizers and scale factors may be indicated in the compressed stream.

An encoder can apply error-feedback techniques to ensure that successive quantization errors do not accumulate and adversely affect the reconstructed data.

Unique Identifiers

As described above, in some implementations, an encoder can encode, for each building, one or more identifiers associated with that building. In some implementations, each of the identifiers can be a unique identifier that is not associated with any other building. Unique identifiers can be used, for example, to distinguish buildings from one another in a database and/or in map data.

Figure 7:
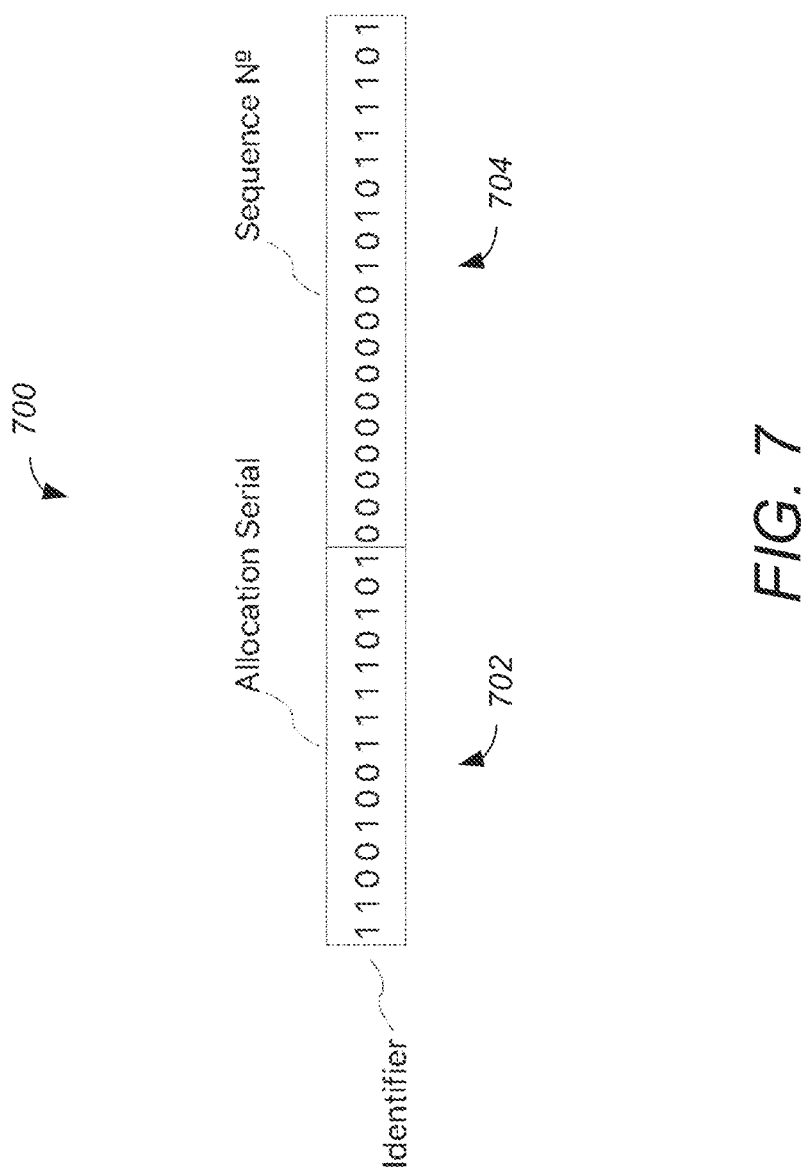
FIG. 7 is a diagram of an example identifier.
Figure 8A:
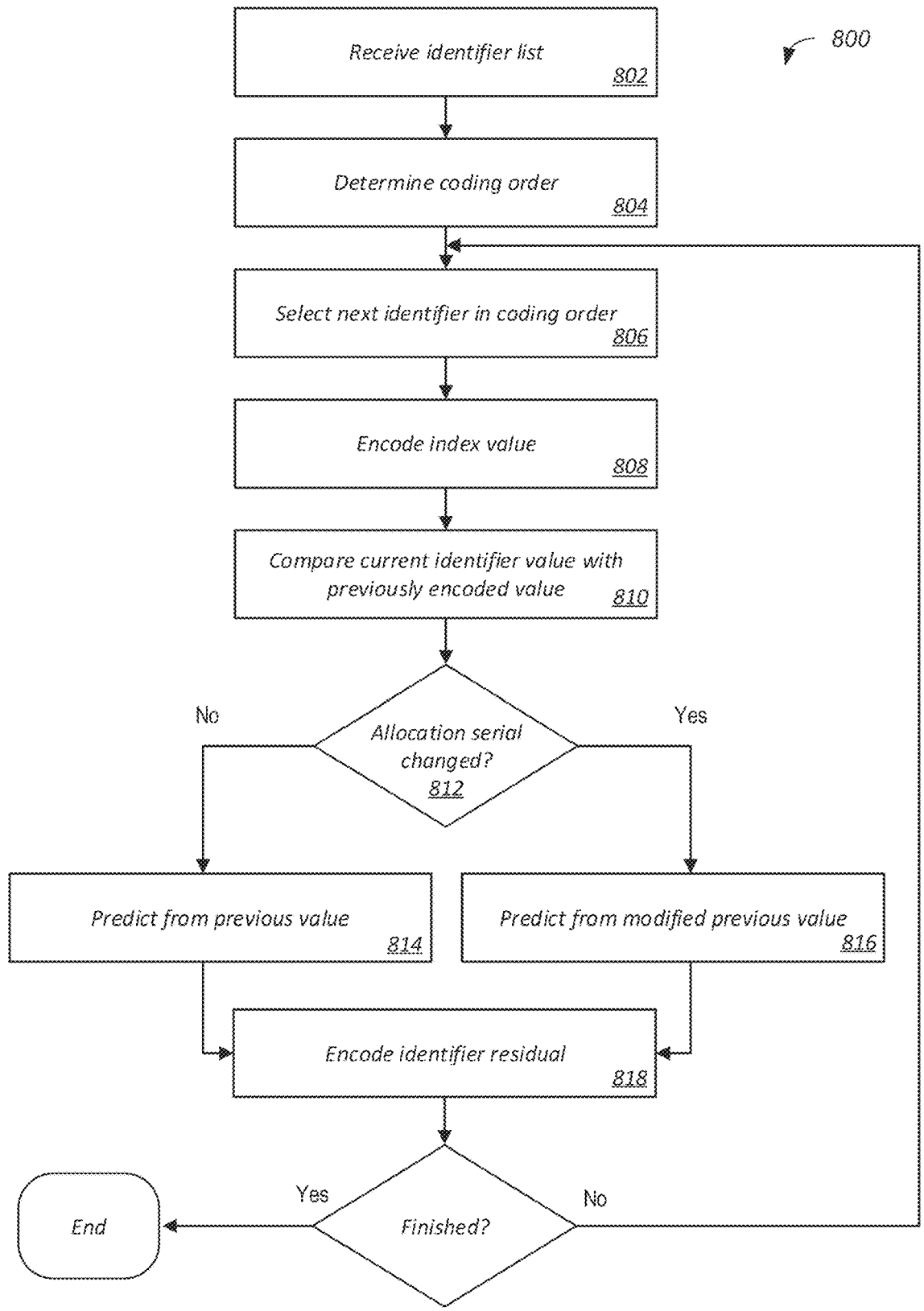

In some implementations, buildings can be assigned to one or more groups (e.g., groups of buildings). Further, an identifier for a particular building can include a first portion identifying the group to which that building is assigned, and a second portion identifying that building within the group. As an example, as shown in FIG. 7, an identifier 700 for a building can include a first portion 702 identifying a group (e.g., an "allocation serial"). Further, the identifier for the building can include a second portion 704 identifying the building within the group (e.g., a "sequence number"). Buildings assigned to the same group can each have identifiers including the same allocation serial, and different respective sequence numbers. Buildings assigned to different groups can each have identifiers including different allocation serials.

In some implementations, the first portion 702 and second portion 704 can be binary values, each having a respective fixed bit length. In the example shown in FIG. 7, the first portion 702 is a binary value having a bit length of 15, and the second portion 704 is a binary value having a bit length of 20. However, in practice, the bit lengths of the first portion 702 and the second portion 704 can vary, depending on the implementation. As an example in some implementations, an identifier can include a first portion having a bit length of 44 bits, followed by a second portion having a bit length of 20 bits (e.g., having a total bit length of 64 bits).

In some implementations, an encoder (e.g., the encoder 104) can include, in the encoded map data 114, data representing the identifiers of each of the buildings in a particular geographical location. Further, this data can be encoded such that the map data has a smaller size (or length) compared to map data encoded using other techniques.

An example process 800 for encoding a set of identifiers 850 is shown in FIGS. 8A-8D. The process 800 can be performed, at least in part, by the system 100 or components thereof (e.g., the encoder 104).

According to the process 800, a system receives a set of identifiers (block 802). An example set of identifiers 850 is shown in FIG. 8B. In this example, the set of identifiers 850 includes several identifiers A, B, C, and D, each corresponding to a different respective building. Each of the identifiers has a first portion identifying the group to which a particular building has been assigned, followed by a second portion identifying that building within the group. For example, the identifiers A and D correspond to buildings in a first group, the identifier B correspond to a building in a second group, and the identifier C correspond to a building in a third group.

The system determines a coding order for the set of identifiers (block 804). In some implementations, the coding order can be determined by sorting the set of identifiers 850 according to ascending numerical value (e.g., from the lowest value identifier to the high value identifier).

For example, FIG. 8C shows the set of identifiers 850, represented as decimal values rather than binary values. The set of identifiers 850 are initially arranged according to the sequence A, B, C, and D (indicated by source index values 0, 1, 2, and 3, respectively). The system can re-sort the set of identifiers 850 according to ascending numerical value (e.g., in the order B, A, D, and C). Further, the system can record the original order of the set of identifiers 850 (indicated by the output index values 1, 0, 3, and 2, respectively), such that the set of identifiers 850 can be re-arranged to the original order during the decoding process.

The system sequentially processes each of the identifiers according to the determined coding order.

For example, the system selects the next identifier in the coding order (block 806), and encodes the index value (block 808). Further, for each of the identifiers other than the first identifier, the system compares the current identifier value with the previously encoded value (block 810), and determines whether the allocation serial number has changed between the previously encoded value and the current identifier value (block 812). In some implementations, the system can determine whether the allocation serial number has changed by performing a bitwise XOR (exclusive or) operation on (i) the current identifier, and (ii) the identifier preceding that identifier in the coding order. If the output of this operation is greater than the largest representable sequence number (e.g., the bits of the output corresponding to the allocation serial bits are all equal to zero), the system determines that the allocation serial number has changed.

In some embodiments, the index value is delta coded with respect to the previous coded index value. Since it is not meaningful for two elements to use the same index value, the encoding of the delta encoded value can prohibit the coding of a zero difference by coding the absolute delta value minus1 and a sign symbol. In such an embodiment, the first instance of a coded index value, when no previous value is available, is delta coded with respect to the value −1 in case the first index value is itself zero. In some embodiments, the absolute delta value minus1 is coded using an exponential Golomb code with, for example, the code parameter k=0. The binary symbols forming the prefix of the exponential Golomb coded value may be coded using a dedicated adaptive context model per bin. In some embodiments, the sign symbol is coded using a dedicated adaptive context model.

If the allocation serial number has not changed between the previously encoded value and the current identifier value, the system generates a prediction residual based on the previously encoded value (block 814).

Alternatively, if the allocation serial number has changed between the previously encoded value and the current identifier value, the system generates a prediction residual based on a modified version of the previous value (block 814). In particular, the modified version is generated by setting the sequence number of the previous value (e.g., the second portion of the previous value) to a sequence of zeros.

In both cases, the system encodes the prediction residual for the identifier in the map data (block 818).

An embodiment can use context adaptive binary arithmetic coding (CABAC) to code the prediction residual, where a first binary symbol using a dedicated adaptive context model indicates whether the prediction residual is equal to zero and in cases where it is not, the prediction residual not equal to zero is coded.

In some embodiments, the context model probability of this first binary symbol is initialized to indicate a very high probability that the prediction residual is not equal to zero. For example, the probability that the prediction residual is equal to zero can be initialized to $1:2^{12}$. Where it is expected that the coded identifiers are unique, but there remains the remote possibility that an identifier is repeated (for instance, two buildings with the same identifier), such an encoding permits an efficient representation of the likely state, consuming, for example, approximately one bit per 2800 identifiers.

In some embodiments, the coding of the prediction residual not equal to zero comprises two parts. A first part indicates the position of the most significant 1-bit in the binary representation of the prediction residual. A second part codes the least significant bits that follow the most significant bit. In some embodiments, the first part is coded using an exponential Golomb code with, for example, the code parameter k=0. The binary symbols forming the prefix of the exponential Golomb coded values may be coded using a dedicated adaptive context model per bin. In some embodiments, the second part is coded according to its binary representation using a dedicated adaptive context model per bit position.

FIG. 8D shows an example processing of the set of identifiers 850 in accordance with the process 800.

For example, when processing the identifier A, the system compares the value of the identifier A to the value of the identifier B (e.g., the identifier previous to the identifier A on the coding order). The allocation serial (e.g., the first portion of the identifier) has changed from the identifier B to the identifier A. Accordingly, the system generates a modified version of the identifier B, in which the sequence number of the identifier B (e.g., the second portion of the identifier B) is set to a sequence of zeros. Further, the system generates a prediction residual for the identifier A as the value of the identifier A minus the value of the modified identifier B (e.g., $A-B_{modified}$). This prediction residual is encoded in the map data.

As another example, when processing the identifier D, the system compares the value of the identifier D to the value of the identifier A (e.g., the identifier previous to the identifier D on the coding order). The allocation serial has not changed from the identifier A to the identifier D. Accordingly, the system generates a prediction residual for the identifier D as the value of the identifier D minus the value of the identifier A (e.g., D−A). This prediction residual is encoded in the map data.

As another example, when processing the identifier C, the system compares the value of the identifier C to the value of the identifier D (e.g., the identifier previous to the identifier C on the coding order). The allocation serial (e.g., the first portion of the identifier) has changed from the identifier D to the identifier C. Accordingly, the system generates a modified version of the identifier D, in which the sequence number of the identifier D (e.g., the second portion of the identifier D) is set to a sequence of zeros. Further, the system generates a prediction residual for the identifier C as the value of the identifier C minus the value of the modified identifier D (e.g., $C-D_{modified}$). This prediction residual is encoded in the map data.

The process shown in blocks 806-818 is repeated for each of the remaining identifiers according to the coding order. Upon reaching the end of the coding order, the system terminates the process 800.

The process 800 can be beneficial, for example, as it enables a set of identifiers to be encoded according to a smaller size (or length) compared to encoding a set of identifiers using other techniques. For example, by selectively generating prediction residuals in certain situations (e.g., when the allocation serial has changed between identifiers), the system can increase the likelihood that a prediction residual will include a sequence of zeros. Sequences of zeros can, at least in some cases, reduce the entropy of a sequence of bits, which enables the sequence of bits to be compressed according to a higher degree of efficiency.

As an example, as shown in FIG. 8D, the prediction residuals for the identifier A (e.g., $A-B_{modified}$) includes a sequence of zeros, indicated by the label "X". In contrast, if the prediction residual for the identifier A were to be calculated based on unmodified versions of the identifier B, the prediction residuals would not include this sequence of zeros. For example, as shown in FIG. 8E, a prediction residual A–B would result in a sequence of ones instead, which would increase the entropy of the prediction residual and reduce the extent to which the prediction residual can be compressed.

Figure 9:
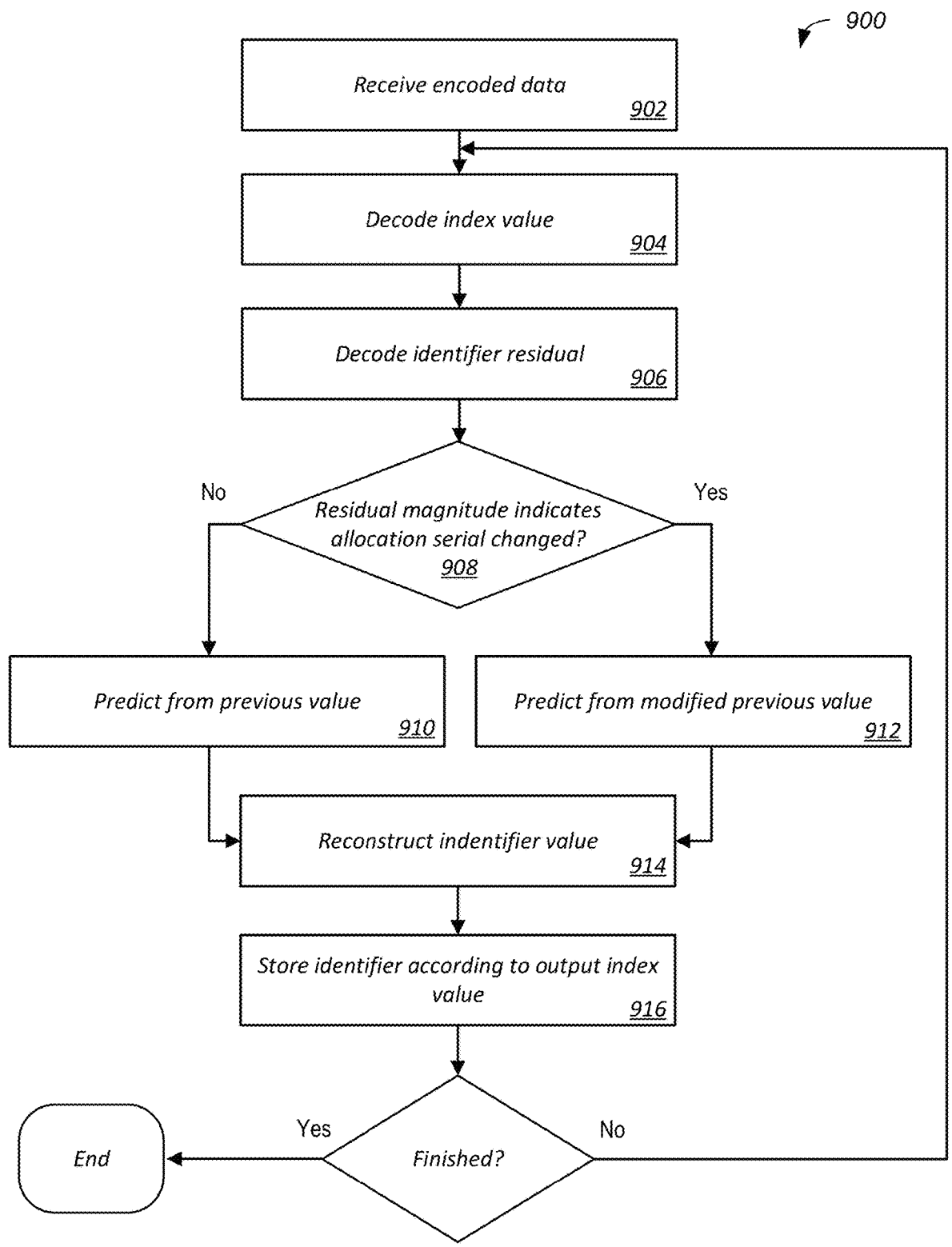
FIG. 9 is a diagram of an example process for decoding a set of identifiers.

An example process 900 for decoding a set of identifiers is shown in FIG. 9. The process 900 can be performed, at least in part, by the system 100 or components thereof (e.g., the decoder 108).

According to the process 900, a system receives encoded data representing a set of identifiers (block 902). The encoded data can be generated, for example, using the process 800 shown in FIG. 8A.

The system sequentially decodes each of the identifiers from the encoded date.

For example, the system decodes an index value for an identifier (block 904). As described with reference to FIG. 8C, the index value (e.g., the output index values) indicate the original order of the identifiers in the set, prior to the set of identifies being re-ordered by the encoder.

Further, the system decodes a prediction residual for the identifier (block 906), and determines whether the magnitude of the prediction residual itself indicates that the allocation serial has changed between the previously decoded identifier and the current identifier (block 908). For example, if the prediction residual is less than or equal to the largest representable sequence number, the system cannot determine from the prediction residual alone that the allocation serial has not changed between the previously decoded identifier and the current identifier. As another example, if the prediction residual is greater than the largest representable sequence number, the system can determine from the prediction residual alone that the allocation serial has changed between the previously decoded identifier and the current identifier.

If the system determines that the prediction residual alone does not indicate that the allocation serial has changed between the previously decoded identifier and the current identifier, the system can predict the identified value for the identifier based on the value of the previously decoded identifier (block 910). For example, the system can add the prediction residual to the value of the previously decoded identifier.

Alternatively, if the system determines that the allocation serial has changed from the prediction residual alone, the system can predict the identified value for the identifier based on a modified version of the previously decoded identifier (block 912). For example, the system can add the prediction residual to the modified version of the previously decoded identifier. As described with reference to FIG. 8A, the modified version can be generated by setting the sequence number of the previous identifier (e.g., the second portion of the previous identifier) to sequence of zeros.

In both cases, the system reconstructs the identifier value (block 914), and stores the reconstructed value according to the decoded index value (block 916).

The process shown in blocks 904-916 is repeated for each of the remaining identifiers. Upon reaching the end of the encoded data, the system terminates the process 900.

Although the description above illustrates the use of identifiers to identify buildings, in practice, identifiers can be used to identify any object relevant to map data. As an example, identifiers can be used to identify objects such as buildings, other structures (e.g., towers, bridges, lighting devices, etc.), routes (e.g., streets, paths, railways, etc.), naturally occurring features (e.g., oceans, lakes, rivers, hills, mountains, valleys, trees, plants, etc.), signs, traffic control devices (e.g., traffic signals), or any other object that could be presented using a map.

Example Processes

Figure 10:
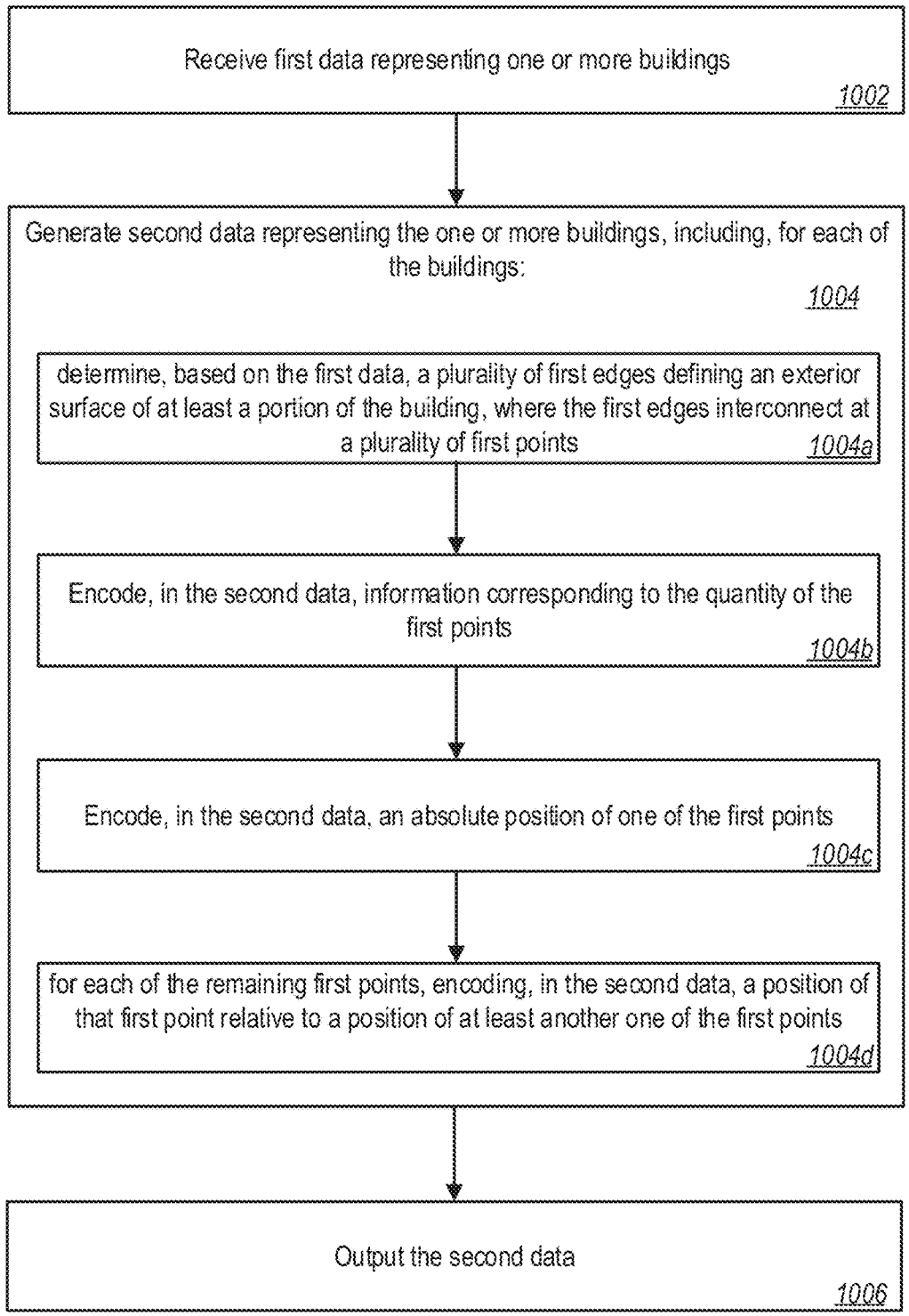
FIG. 10 is a diagram of an example process for processing map data.

FIG. 10 shows an example process 1000 for generating map data. The process 1000 can be performed, at least in part, using one or more computers systems or devices (e.g., one or more of the computer systems shown in FIG. 11).

According to the process 1000, a system receives first data representing one or more buildings (block 1002). As an example, the first data can specify the dimensions, locations, orientations, heights, and/or any other properties regarding the one or more buildings.

Further, the system generates second data representing the one or more buildings (block 1004). The second data is generated, at least in part, by performing several actions (e.g., as shown in blocks 1004a-1004d) for each of the one or buildings.

For example, for each of the buildings, the system determines, based on the first data, a plurality of first edges defining an exterior surface of at least a portion of the building (block 1004a). The first edges interconnect at a plurality of first points. As an example, the exterior surface can correspond to an outer periphery of exterior footprint of at least a portion of the building.

Further, the system encodes, in the second data, information corresponding to the quantity of the first points (block 1004b). In some implementations, information corresponding to the quantity of the first points can include a numerical value representing the quantity of the first points minus a first constant value. The first constant value can be three.

Further, the system encodes, in the second data, an absolute position of one of the first points (block 1004c). In some implementations, the absolute position of one of the first points can be encoded according to one or more quantization scales. The one or more quantization scales can include a first quantitation scale corresponding to a first spatial dimension (e.g., an x-, y-, or z-dimension), and a second quantization scale corresponding to a second spatial dimension different from the first spatial dimension (e.g., another one of the x-, y-, or z-dimensions).

Further, for each of the remaining first points, the system encodes, in the second data, a position of that first point relative to a position of at least another one of the first points (block 1004d).

In some implementations, generating the second data can include performing the following steps for each of the one or more buildings. A system can determine, based on the second data, a plurality of second edges defining one of the void regions of at least the portion of that building, where the second edges interconnect at a plurality of second points. As san example, a void region can be a hole or gap along an interior the building that would be visible for an overhead view. Further, the system can encode, in the second data, information corresponding to the quantity of the second points. Further, the system can encode, in the second data, an absolute position of one of the second points. Further, for each of the remaining second points, the system can encode, in the second data, a position of that second point relative to a position of at least another one of the second points. In some implementations, the information corresponding to the quantity of the second points can include a numerical value representing the quantity of the second points minus a second constant value (e.g., a constant value of three).

In some implementations, generating the second data can include, for at least one of the one or more buildings, encoding information indicating a height of at least a portion of that building in the second data.

In some implementations, generating the second data can include, for at least one of the one or more buildings, encoding information indicating one or more materials of at least a portion of that building in the second data.

The system outputs the second data (block 1006).

In some implementations, the one or more buildings can include a first building and a second building. Further, generating the second data can include (i) determining, based on the first data, that an exterior surface of the first building coincides with an exterior surface of the second building, and (ii) encoding, in the second data, an indication that the exterior surface of the first building coincides with an exterior surface of a second building.

In some implementations, the one or more buildings can include a first building and a second building. Further, generating the second data can include (i) determining, based on the first data, that one of the first points associated with the first building coincides with one of the first points associated with the second building, and (ii) encoding, in the second data, an indication that that one of the first points associated with the first building coincides with one of the first points associated with the second building.

In some implementations, generating the second data can include, for each of the one or more buildings, encoding, an identifier associated with that building in the second data.

Each of the identifiers can include a first portion indicating a group with which that building is associated (e.g., an "allocation serial number"), and a second portion indicating a sequential number assigned to that building within the group (e.g., a "sequence number"). Further, the first portion of an identifier can precede the second portion of that identifier. An example identifier including these two portions is shown in FIG. 7.

In some implementations, the one or more buildings can include a plurality of buildings. Further, the system can encode the identifiers associated with the plurality of buildings by generating a sequentially sorted list of the identifiers, and encoding, in the second data, the first identifier in the sequentially sorted list. Further, for each of the remaining identifiers in the sequentially sorted list, the system can encode a difference between (i) that identifier and (ii) the identifier preceding that identifier in the sequentially sorted list can be encoded in the second data.

In some implementations, the one or more buildings can include a plurality of buildings. Further, the system can encode the identifiers associated with the plurality of buildings by generating a sequentially sorted list of the identifiers, and encoding, in the second data, the first identifier in the sequentially sorted list. Further, for each of the remaining identifiers in the sequentially sorted list, the system can perform a bitwise XOR operation on (i) that identifier and (ii) the identifier preceding that identifier in the sequentially sorted list.

In some implementations, for each of the remaining identifiers in the sequentially sorted list, the system can determine that that an output of the bitwise XOR operation is less than or equal to a largest number that can be presented using the second portion of that identifier (e.g., the bits of the output corresponding to the allocation serial bits are all equal to zero). In response, the system can encode, in the second data, a difference between (i) that identifier and (ii) the identifier preceding that identifier in the sequentially sorted list.

In some implementations, for each of the remaining identifiers in the sequentially sorted list, the system can determine that an output of the bitwise XOR operation is greater than a largest number that can be presented using the second portion of that identifier (e.g., the bits of the output corresponding to the allocation serial bits are all equal to zero). In response, the system can encode, in the second data, a difference between (i) that identifier and (ii) a modified version of the identifier preceding that identifier in the sequentially sorted list. In some implementations, the modified version can be generated by setting the second portion of the identifier preceding that identifier in the sequentially sorted list to a sequence of zeros.

In some implementations, the system can generate, based on the second data, a graphical map including a graphical representation of each of the one or more buildings.

Example Computer System

Figure 11:
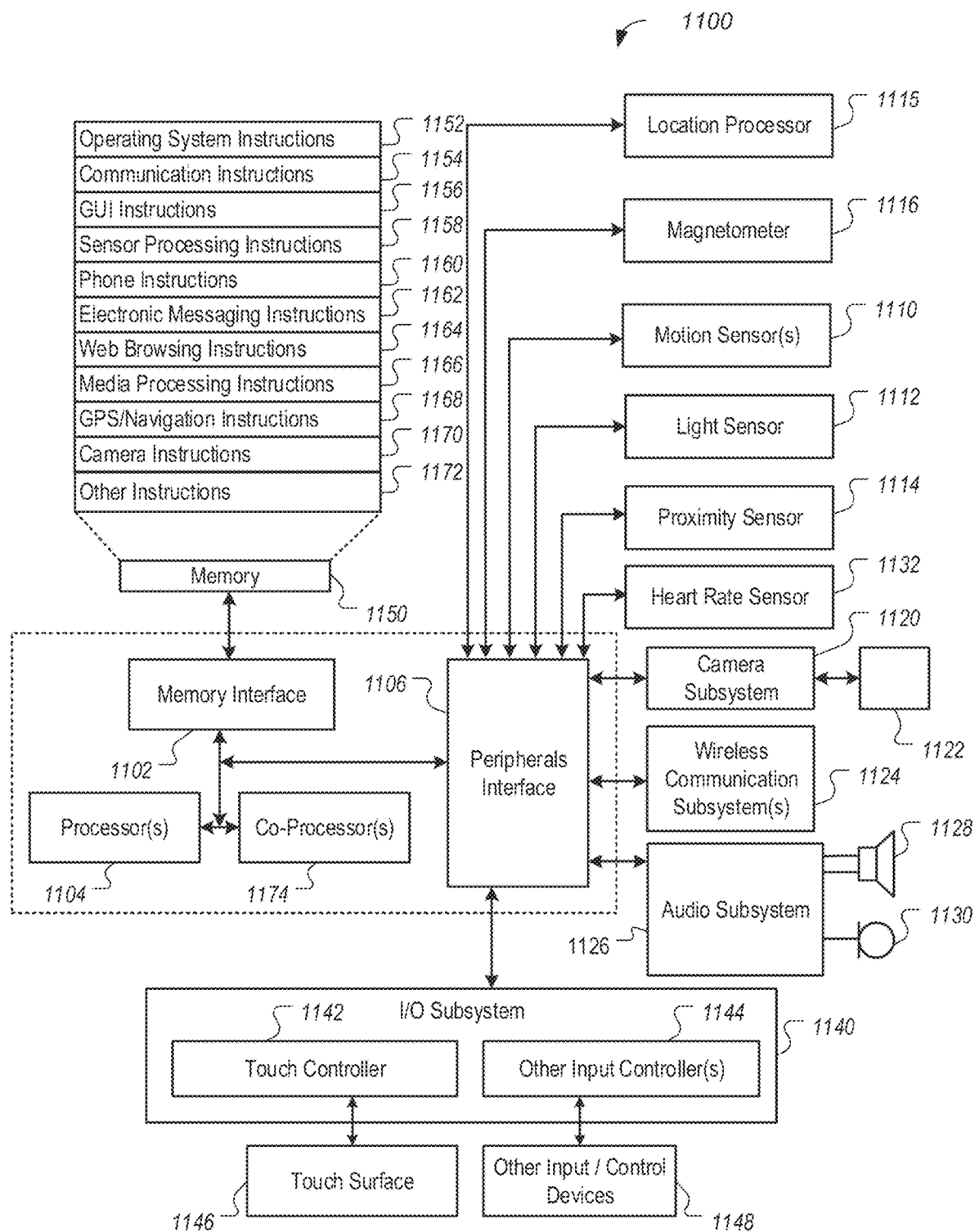
FIG. 11 is a diagram of an example device architecture for implementing the features and processes described in reference to FIGS. 1-10.

FIG. 11 is a block diagram of an example device architecture 1100 for implementing the features and processes described in reference to FIGS. 1-10. For example, the architecture 1100 can be used to implement the system 100 and/or one or more components of the system 100. The architecture 1100 may be implemented in any device for generating the features described in reference to FIGS. 1-10, including but not limited to desktop computers, server computers, portable computers, smart phones, tablet computers, game consoles, wearable computers, holographic displays, set top boxes, media players, smart TVs, and the like.

The architecture 1100 can include a memory interface 1102, one or more data processor 1104, one or more data co-processors 1174, and a peripherals interface 1106. The memory interface 1102, the processor(s) 1104, the co-processor(s) 1174, and/or the peripherals interface 1106 can be separate components or can be integrated in one or more integrated circuits. One or more communication buses or signal lines may couple the various components.

The processor(s) 1104 and/or the co-processor(s) 1174 can operate in conjunction to perform the operations described herein. For instance, the processor(s) 1104 can include one or more central processing units (CPUs) that are configured to function as the primary computer processors for the architecture 1100. As an example, the processor(s) 1104 can be configured to perform generalized data processing tasks of the architecture 1100. Further, at least some of the data processing tasks can be offloaded to the co-processor(s) 1174. For example, specialized data processing tasks, such as processing motion data, processing image data, encrypting data, and/or performing certain types of arithmetic operations, can be offloaded to one or more specialized co-processor(s) 1174 for handling those tasks. In some cases, the processor(s) 1104 can be relatively more powerful than the co-processor(s) 1174 and/or can consume more power than the co-processor(s) 1174. This can be useful, for example, as it enables the processor(s) 1104 to handle generalized tasks quickly, while also offloading certain other tasks to co-processor(s) 1174 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 1104 for further analysis.

Sensors, devices, and subsystems can be coupled to peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions of the architecture 1100. For example, in some implementations, a light sensor 1112 can be utilized to facilitate adjusting the brightness of a touch surface 1146. In some implementations, a motion sensor 1110 can be utilized to detect movement and orientation of the device. For example, the motion sensor 1110 can include one or more accelerometers (e.g., to measure the acceleration experienced by the motion sensor 1110 and/or the architecture 1100 over a period of time), and/or one or more compasses or gyros (e.g., to measure the orientation of the motion sensor 1110 and/or the mobile device). In some cases, the measurement information obtained by the motion sensor 1110 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 1110 can be directly integrated into a co-processor 1174 configured to processes measurements obtained by the motion sensor 1110. For example, a co-processor 1174 can include one more accelerometers, compasses, and/or gyroscopes, and can be configured to obtain sensor data from each of these sensors, process the sensor data, and transmit the processed data to the processor(s) 1104 for further analysis.

Other sensors may also be connected to the peripherals interface 1106, such as a temperature sensor, a biometric sensor, or other sensing device, to facilitate related functionalities. As an example, as shown in FIG. 11, the architecture 1100 can include a heart rate sensor 1132 that measures the beats of a user's heart. Similarly, these other sensors also can be directly integrated into one or more co-processor(s) 1174 configured to process measurements obtained from those sensors.

A location processor 1115 (e.g., a GNSS receiver chip) can be connected to the peripherals interface 1106 to provide geo-referencing. An electronic magnetometer 1116 (e.g., an integrated circuit chip) can also be connected to the peripherals interface 1106 to provide data that may be used to determine the direction of magnetic North. Thus, the electronic magnetometer 1116 can be used as an electronic compass.

A camera subsystem 1120 and an optical sensor 1122 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 1124. The communication subsystem(s) 1124 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 1124 can depend on the communication network(s) or medium(s) over which the architecture 1100 is intended to operate. For example, the architecture 1100 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 1100 can be configured as a base station for other wireless devices. As another example, the communication subsystems may allow the architecture 1100 to synchronize with a host device using one or more protocols, such as, for example, the TCP/IP protocol, HTTP protocol, UDP protocol, and any other known protocol.

An audio subsystem 1126 can be coupled to a speaker 1128 and one or more microphones 1130 to facilitate voice-enabled functions, such as voice recognition, voice replication, digital recording, and telephony functions.

An I/O subsystem 1140 can include a touch controller 1142 and/or other input controller(s) 1144. The touch controller 1142 can be coupled to a touch surface 1146. The touch surface 1146 and the touch controller 1142 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 1146. In one implementation, the touch surface 1146 can display virtual or soft buttons and a virtual keyboard, which can be used as an input/output device by the user.

Other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In some implementations, the architecture 1100 can present recorded audio and/or video files, such as MP3, AAC, and MPEG video files. In some implementations, the architecture 1100 can include the functionality of an MP3 player and may include a pin connector for tethering to other devices. Other input/output and control devices may be used.

A memory interface 1102 can be coupled to a memory 1150. The memory 1150 can include high-speed random access memory or non-volatile memory, such as one or more magnetic disk storage devices, one or more optical storage devices, or flash memory (e.g., NAND, NOR). The memory 1150 can store an operating system 1152, such as Darwin, RTXC, LINUX, UNIX, OS X, WINDOWS, or an embedded operating system such as VxWorks. The operating system 1152 can include instructions for handling basic system services and for performing hardware dependent tasks. In some implementations, the operating system 1152 can include a kernel (e.g., UNIX kernel).

The memory 1150 can also store communication instructions 1154 to facilitate communicating with one or more additional devices, one or more computers or servers, including peer-to-peer communications. The communication instructions 1154 can also be used to select an operational mode or communication medium for use by the device, based on a geographic location (obtained by the GPS/Navigation instructions 1168) of the device. The memory 1150 can include graphical user interface instructions 1156 to facilitate graphic user interface processing, including a touch model for interpreting touch inputs and gestures; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1168 to facilitate GPS and navigation-related processes; camera instructions 1170 to facilitate camera-related processes and functions; and other instructions 1172 for performing some or all of the processes described herein.

Each of the above identified instructions and applications can correspond to a set of instructions for performing one or more functions described herein. These instructions need not be implemented as separate software programs, procedures, or modules. The memory 1150 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving first data representing one or more objects;
   generating second data representing the one or more objects, wherein generating the second data comprises, for each of the one or more objects:
      determining, based on the first data, a plurality of first edges defining an exterior surface of at least a portion of the object, wherein the first edges interconnect at a first set of points,
      encoding, in the second data, a numerical value representing a quantity of points in the first set of points,
      determining a first sequence of the first set of points,
      encoding, in the second data, an absolute position of a sequentially first point in the first sequence, and
      for each of the remaining points in the first set of points, encoding, in the second data, a position of that point relative to a position of another point immediately prior to that point in the first sequence; and
   outputting the second data.

2. The method of claim 1, wherein the numerical value representing the quantity of points in the first set of points comprises:
   a numerical value of the quantity of points in the first set of points minus a first constant value.

3. The method of claim 2, wherein the first constant value is three.

4. The method of claim 1, wherein generating the second data comprises, for at least one of the one or more objects:
   determining, based on the second data, a plurality of second edges defining a void region of at least the portion of that object, wherein the second edges interconnect at a second set of points,
   encoding, in the second data, a numerical value representing a quantity of points in the second set of points,
   determining a second sequence of the second set of points,
   encoding, in the second data, an absolute position of a sequentially first point in the second sequence, and
   for each of the remaining points in the second set of points, encoding, in the second data, a position of that second point relative to a position of another point immediately prior to that point in the second sequence.

5. The method of claim 4, wherein the numerical value representing the quantity of points in the second set of points comprises:
   a numerical value of the quantity of points in the second set of points minus a second constant value.

6. The method of claim 5, wherein the second constant value is three.

7. The method of claim 1, wherein generating the second data further comprises, for at least one of the one or more objects:
   encoding, in the second data, information indicating a height of at least a portion of that object.

8. The method of claim 1, wherein generating the second data further comprises, for at least one of the one or more objects:
   encoding, in the second data, information indicating one or more materials of at least a portion of that object.

9. The method of claim 1,
   wherein the one or more objects comprises a first object and a second object, and
   wherein generating the second data comprises:
      determining, based on the first data, that an exterior surface of the first object coincides with an exterior surface of the second object, and
      encoding, in the second data, an indication that the exterior surface of the first object coincides with an exterior surface of the second object.

10. The method of claim 1,
    wherein the one or more objects comprises a first object and a second object, and
    wherein generating the second data comprises:
       determining, based on the first data, that a first point associated with the first object coincides with a second point associated with the second object, and
       encoding, in the second data, an indication that that the first point coincides with the second point.

11. The method of claim 1, wherein the absolute position of the sequentially first point in the first sequence is encoded according to one or more quantization scales.

12. The method of claim 11, wherein the one or more quantization scales comprises a first quantization scale corresponding to a first spatial dimension, and a second quantization scale corresponding to a second spatial dimension different from the first spatial dimension.

13. The method of claim 1, wherein generating the second data comprises, for each of the one or more objects:
    encoding, in the second data, an identifier associated with that object.

14. The method of claim 13, wherein each of the identifiers comprises:
    a first portion indicating a group with which that object is associated, and a second portion indicating a sequential number assigned to that object within the group.

15. The method of claim 14, wherein, for each of the identifiers, the first portion of that identifier precedes the second portion of that identifier.

16. The method of claim 15,
wherein the one or more objects comprises a plurality of objects, and
wherein encoding the identifiers associated with the plurality of objects comprises:
generating a sequentially sorted list of the identifiers,
encoding, in the second data, a first identifier in the sequentially sorted list, and
for each of the remaining identifiers in the sequentially sorted list, encoding, in the second data, a difference between (i) that identifier and (ii) the identifier preceding that identifier in the sequentially sorted list.

17. The method of claim 15,
wherein the one or more objects comprises a plurality of objects, and
wherein encoding the identifiers associated with the plurality of objects comprises:
generating a sequentially sorted list of the identifiers,
encoding, in the second data, a first identifier in the sequentially sorted list, and
for each of the remaining identifiers in the sequentially sorted list:
performing a bitwise XOR operation on (i) that identifier and (ii) the identifier preceding that identifier in the sequentially sorted list.

18. The method of claim 17, wherein encoding the identifiers associated with the plurality of objects comprises, for each of the remaining identifiers in the sequentially sorted list:
determining that that an output of the bitwise XOR operation is less than or equal to a largest number that can be presented using the second portion of that identifier, and
in response, encoding, in the second data, a difference between (i) that identifier and (ii) the identifier preceding that identifier in the sequentially sorted list.

19. The method of claim 17, wherein encoding the identifiers associated with the plurality of objects comprises, for each of the remaining identifiers in the sequentially sorted list:
determining that an output of the bitwise XOR operation is greater than a largest number that can be presented using the second portion of that identifier, and
in response, encoding, in the second data, a difference between (i) that identifier and (ii) a modified version of the identifier preceding that identifier in the sequentially sorted list.

20. The method of claim 19, the modified version is generated by setting the second portion of the identifier preceding that identifier in the sequentially sorted list to a sequence of zeros.

21. The method of claim 1, further comprising:
generating, based on the second data, a graphical map including a graphical representation of each of the one or more objects.

22. The method of claim 1, wherein the one or more objects comprise one or more buildings.

23. The method of claim 1, wherein the one or more objects comprise at least one of:
a structure,
a route,
a naturally occurring feature,
a sign, or
a traffic control device.

24. A device comprising:
one or more processors; and
memory storing instructions that when executed by the one or more processors, cause the one or more processors to perform operations comprising:
receiving first data representing one or more objects;
generating second data representing the one or more objects, wherein generating the second data comprises, for each of the one or more objects:
determining, based on the first data, a plurality of first edges defining an exterior surface of at least a portion of the object, wherein the first edges interconnect at a first set of points,
encoding, in the second data, a numerical value representing a quantity of points in the first set of points,
determining a first sequence of the first set of points,
encoding, in the second data, an absolute position of a sequentially first point in the first sequence, and
for each of the remaining points in the first set of points, encoding, in the second data, a position of that point relative to a position of another point immediately prior to that point in the first sequence; and
outputting the second data.

25. One or more non-transitory, computer-readable storage media having instructions stored thereon, that when executed by one or more processors, cause the one or more processors to perform operations comprising:
receiving first data representing one or more objects;
generating second data representing the one or more objects, wherein generating the second data comprises, for each of the one or more objects:
determining, based on the first data, a plurality of first edges defining an exterior surface of at least a portion of the object, wherein the first edges interconnect at a first set of points,
determining a first sequence of the first set of points,
encoding, in the second data, a numerical value representing a quantity of points in the first set of points,
encoding, in the second data, an absolute position of a sequentially first point in the first sequence, and
for each of the remaining points in the first set of points, encoding, in the second data, a position of first point relative to a position of another point immediately prior to that point in the first sequence; and
outputting the second data.

* * * * *